tion of the DRB corresponding to the
(12) United States Patent　　　(10) Patent No.:　　US 11,375,571 B2
Hori et al.　　　(45) Date of Patent:　　Jun. 28, 2022

(54) TERMINAL APPARATUS, BASE STATION APPARATUS, METHOD, AND INTEGRATED CIRCUIT

(71) Applicants: Sharp Kabushiki Kaisha, Sakai (JP); FG Innovation Company Limited, Tuen Mun (HK)

(72) Inventors: Takako Hori, Sakai (JP); Shohei Yamada, Sakai (JP); Hidekazu Tsuboi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 39 days.

(21) Appl. No.: 17/052,823

(22) PCT Filed: May 7, 2019

(86) PCT No.: PCT/JP2019/018239
§ 371 (c)(1),
(2) Date: Nov. 4, 2020

(87) PCT Pub. No.: WO2019/216309
PCT Pub. Date: Nov. 14, 2019

(65) Prior Publication Data
US 2021/0235535 A1　　Jul. 29, 2021

(30) Foreign Application Priority Data

May 8, 2018　(JP) ............................... JP2018-089864

(51) Int. Cl.
*H04W 76/27*　　(2018.01)
*H04W 76/30*　　(2018.01)

(52) U.S. Cl.
CPC ........... *H04W 76/27* (2018.02); *H04W 76/30* (2018.02)

(58) Field of Classification Search
CPC ..... H04W 76/27; H04W 76/30; H04W 76/11; H04W 76/34
See application file for complete search history.

(56) References Cited

U.S. PATENT DOCUMENTS

2015/0208235 A1\* 7/2015 Ingale ................. H04W 12/041
455/411
2018/0376332 A1\* 12/2018 Basu Mallick ....... H04W 76/25
(Continued)

OTHER PUBLICATIONS

LG Electronics Inc., "Discussion on SDAP entity handling", 3GPP TSG-RAN2 Meeting#101bis, R2-1806093, Apr. 16-20, 2018, pp. 1-3.
(Continued)

*Primary Examiner* — Will W Lin
(74) *Attorney, Agent, or Firm* — Keating & Bennett, LLP

(57) ABSTRACT

Provided is a terminal apparatus for communicating with a base station, the terminal apparatus including: a receiver configured to receive, from the base station apparatus, a Radio Resource Control layer (RRC) reconfiguration message including a list of a Data Radio Bearer (DRB) identity corresponding to a DRB to be released; and a processing unit configured to, in a case that a first DRB identity corresponding to the DRB configured for the terminal apparatus is included in the list, release a Packet Data Convergence Protocol Layer (PDCP) entity associated with the first DRB identity and indicate to a Service Data Adaptation Protocol (SDAP) layer information of the DRB corresponding to the first DRB identity.

4 Claims, 22 Drawing Sheets

(56) References Cited

U.S. PATENT DOCUMENTS

2019/0053098 A1* 2/2019 Jo .................. H04W 88/16
2021/0168882 A1* 6/2021 Chang ............... H04W 76/27

OTHER PUBLICATIONS

Official Communication issued in International Patent Application No. PCT/JP2019/018239, dated Jun. 18, 2019.

NTT Docomo, Inc., "New WID on New Radio Access Technology", 3GPP Tsg Ran Meeting #75, RP-170855, Mar. 6-9, 2017, 8 pages.

"3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.1.0, Mar. 2018, pp. 1-341.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.1.0, Mar. 2018, pp. 1-786.

"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.5.0, Dec. 2017, pp. 1-43.

"3rd Generation Partnership Project; Technical Specification Group Radio Access Network; Evolved Universal Terrestrial Radio Access (E-UTRA); Radio Link Control (RLC) protocol specification (Release 15)", 3GPP TS 36.322 V15.0.1, Apr. 2018, pp. 1-45.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.1.0, Mar. 2018, pp. 1-109.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.1.0, Mar. 2018, pp. 1-52.

"3rd Generation Partnership Project; Technical Specification Group Radio Access Network; NR; NR and NG-RAN Overall Description; Stage 2 (Release 15)", 3GPP TS 38.300 V15.1.0, Mar. 2018, pp. 1-71.

"3rd Generation Partnership Project; Technical Specification Group Radio Access Network; NR; Radio Resource Control (RRC) protocol specification (Release 15)", 3GPP TS 38.331 V15.1.0, Mar. 2018, pp. 1-268.

"3rd Generation Partnership Project; Technical Specification Group Radio Access Network; NR; Packet Data Convergence Protocol (PDCP) specification (Release 15)", 3GPP TS 38.323 V15 1.0, Mar. 2018, pp. 1-25.

"3rd Generation Partnership Project; Technical Specification Group Radio Access Network; NR; Radio Link Control (RLC) protocol specification (Release 15)", 3GPP TS 38.322 V15.1.0, Mar. 2018, pp. 1-33.

"3rd Generation Partnership Project; Technical Specification Group Radio Access Network; NR; Medium Access Control (MAC) protocol specification (Release 15)", 3GPP TS 38.321 V15.1.0, Mar. 2018, pp. 1-67.

"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.3.0, Mar. 2017, pp. 1-386.

"3rd Generation Partnership Project; Technical Specification Group Services and System Aspects; Procedures for the 5G System; Stage 2 (Release 15)", 3GPP TS 23.502 V15.1.0, Mar. 2018, pp. 1-285.

"3rd Generation Partnership Project; Technical Specification Group Radio Access Network; E-UTRA and NR; Service Data Adaptation Protocol (SDAP) specification (Release 15)", 3GPP TS 37.324 V1.5.0, Apr. 2018, pp. 1-12.

* cited by examiner

```
<OMITTED>
fullConfig            ENUMERATED [true]                              OPTIONAL,
    <PARTLY OMITTED>
DRB-ToAddModList ::= SEQUENCE (size (1..maxQoSFlowID)) OF DRB-ToAddMod
    <PARTLY OMITTED>
DRB-ToAddMod ::= SEQUENCE [
    <PARTLY OMITTED>
    eps-BearerIdentity        INTEGER (0..15)                         OPTIONAL,
    drb-Identity              DRB-Identity                            OPTIONAL,
    pdcp-Config               PDCP-Config                             OPTIONAL,
    <PARTLY OMITTED>
]
    <PARTLY OMITTED>
DRB-Identity ::=              INTEGER (1..32)
    <OMITTED>
```

FIG. 6

```
<OMITTED>
RadioBearerConfig ::=            SEQUENCE [
    <PARTLY OMITTED>
    drb-ToAddModList             DRB-ToAddModList       OPTIONAL, -- Need N
    drb-ToReleaseList            DRB-ToReleaseList      OPTIONAL, -- Need N
    <PARTLY OMITTED>
]

DRB-ToAddModList ::= SEQUENCE (SIZE (1..maxDRB)) OF DRB-ToAddMod
DRB-ToAddMod ::=    SEQUENCE [
    cnAssociation               CHOICE [
        eps-BearerIdentity          INTEGER (0..15),    -- EPS-DRB-Setup
        sdap-Config                 SDAP-Config         -- 5GC
    }                           OPTIONAL, -- Cond DRBSetup
    drb-Identity                DRB-Identity,
    <PARTLY OMITTED>
    pdcp-Config                 PDCP-Config             OPTIONAL,    -- Cond PDCP
    <PARTLY OMITTED>
]

DRB-ToReleaseList ::= SEQUENCE (SIZE (1..maxDRB)) OF DRB-Identity
    <PARTLY OMITTED>
DRB-Identity ::=                INTEGER (1..32)
    <PARTLY OMITTED>
SDAP-Config ::=     SEQUENCE [
    <PARTLY OMITTED>
    mappedQoS-FlowsToAdd         SEQUENCE (SIZE (1..maxNrofQFIs)) OF QFI
    mappedQoS-FlowsToRelease     SEQUENCE (SIZE (1..maxNrofQFIs)) OF QFI
    ...
]

<OMITTED>
```

FIG. 18

```
<OMITTED>
CellGroupConfig ::=       SEQUENCE {
   <PARTLY OMITTED>
   spCellConfig           SpCellConfig    OPTIONAL,   -- Need M
   <PARTLY OMITTED>
   <PARTLY OMITTED>
SpCellConfig ::=          SEQUENCE {
   <PARTLY OMITTED>
   reconfigurationWithSync  ReconfigurationWithSync  OPTIONAL,  -- Cond ReconfWithSync
   <PARTLY OMITTED>
}
<OMITTED>
```

FIG. 19

TERMINAL APPARATUS, BASE STATION APPARATUS, METHOD, AND INTEGRATED CIRCUIT

TECHNICAL FIELD

The present invention relates to a terminal apparatus, a base station apparatus, a method, and an integrated circuit.

This application claims priority based on JP 2018-089864 filed on May 8, 2018, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (EUTRA)") and a core network (which will be referred to as "Evolved Packet Core or EPC") have been studied by the 3rd Generation Partnership Project (3GPP).

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501 v15.1.0, "System Architecture for the 5G System; Stage 2"
NPL 3: 3GPP TS 36.300 v15.1.0, "Evolved Universal Terrestrial Radio Access (E-UTRA) and Evolved Universal Terrestrial Radio Access Network (E-UTRAN); Overall description; Stage 2"
NPL 4: 3GPP TS 36.331 v15.1.0, "Evolved Universal Terrestrial Radio Access (E-UTRA); Radio Resource Control (RRC); Protocol specifications"
NPL 5: 3GPP TS 36.323 v14.5.0, "Evolved Universal Terrestrial Radio Access (E-UTRA); Packet Data Convergence Protocol (PDCP) specification"
NPL 6: 3GPP TS 36.322 v15.0.1, "Evolved Universal Terrestrial Radio Access (E-UTRA); Radio Link Control (RLC) protocol specification"
NPL 7: 3GPP TS 36.321 v15.1.0, "Evolved Universal Terrestrial Radio Access (E-UTRA); Medium Access Control (MAC) protocol specification"
NPL 8: 3GPP TS 37.340 v15.1.0, "Evolved Universal Terrestrial Radio Access (E-UTRA) and NR; Multi-Connectivity; Stage 2"
NPL 9: 3GPP TS 38.300 v15.1.0, "NR; NR and NG-RAN Overall description; Stage 2"
NPL 10: 3GPP TS 38.331 v15.1.0, "NR; Radio Resource Control (RRC); Protocol specifications"
NPL 11: 3GPP TS 38.323 v15.1.0, "NR; Packet Data Convergence Protocol (PDCP) specification"
NPL 12: 3GPP TS 38.322 v15.1.0, "NR; Radio Link Control (RLC) protocol specification"
NPL 13: 3GPP TS 38.321 v15.1.0, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"
NPL 15: 3GPP TS 23.502 v15.1.0, "Procedure for 5G System; Stage 2"
NPL 16: 3GPP TS 37.324 v1.5.0, "NR; Service Data Adaptation Protocol (SDAP) Specification"

SUMMARY OF INVENTION

Technical Problem

As one of the technical studies of NR, a mechanism called Multi-RAT Dual Connectivity (MR-DC) is being studied that allows cells of Radio Access Technologies (RATs) of both E-UTRA and NR to be grouped into a cell group on a RAT basis and to be allocated to a UE such that a terminal apparatus and one or more base station apparatuses communicate with each other (NPL 8). Further, as one of the technical studies of NR, a mechanism (Stand Alone (SA)) is being studied that allows cells of a RAT of only NR to be grouped into a cell group and to be allocated to a UE such that a terminal apparatus and a base station apparatus communicate with each other.

However, E-UTRA-NR Dual Connectivity (EN-DC) in which the MR-DC is performed by using a core network of E-UTRA and using a base station of E-UTRA as a master station and the MR-DC and the SA in which a core network of NR is used use different formats and functions of communication protocols. Thus, there is a problem that the communication between the base station apparatus and the terminal apparatus cannot be efficiently performed.

One aspect of the present invention is made in view of the circumstances described above, and one object thereof is to provide a terminal apparatus capable of efficiently communicating with a base station apparatus, a base station apparatus, a method used for the terminal apparatus, and an integrated circuit mounted in the terminal apparatus.

Solution to Problem

In order to accomplish the object described above, an aspect of the present invention is contrived to provide the following means. Specifically, one aspect of the present invention is a terminal apparatus for communicating with a base station apparatus, the terminal apparatus including: a receiver configured to receive, from the base station apparatus, a Radio Resource Control layer (RRC) reconfiguration message including a list of a Data Radio Bearer (DRB) identity corresponding to a DRB to be released; and a processing unit configured to, in a case that a first DRB identity corresponding to the DRB configured for the terminal apparatus is included in the list, release a Packet Data Convergence Protocol Layer (PDCP) entity associated with the first DRB identity and indicate to a Service Data Adaptation Protocol (SDAP) layer information of the DRB corresponding to the first DRB identity.

One aspect of the present invention is a base station apparatus for communicating with a terminal apparatus, the base station apparatus including: a transmitter configured to transmit, to the terminal apparatus, a Radio Resource Control layer (RRC) reconfiguration message including a list of a Data Radio Bearer (DRB) identity corresponding to a DRB to be released; and a processing unit configured to, in a case that a first DRB identity corresponding to the DRB configured for the terminal apparatus is included in the list, cause the terminal apparatus to release a Packet Data Convergence Protocol Layer (PDCP) entity associated with the first DRB identity and indicate to a Service Data Adaptation Protocol (SDAP) layer information of the DRB corresponding to the first DRB identity.

One aspect of the present invention is a method for a terminal apparatus for communicating with a base station apparatus, the method including: receiving, from the base station apparatus, a Radio Resource Control layer (RRC) reconfiguration message including a list of a Data Radio Bearer (DRB) identity corresponding to a DRB to be released; and in a case that a first DRB identity corresponding to the DRB configured for the terminal apparatus is included in the list, releasing a Packet Data Convergence Protocol Layer (PDCP) entity associated with the first DRB identity and indicating to a Service Data Adaptation Protocol (SDAP) layer information of the DRB corresponding to the first DRB identity.

One aspect of the present invention is a method for a base station apparatus for communicating with a terminal apparatus, the method including: transmitting, to the terminal apparatus, a Radio Resource Control layer (RRC) reconfiguration message including a list of a Data Radio Bearer (DRB) identity corresponding to a DRB to be released; and in a case that a first DRB identity corresponding to the DRB configured for the terminal apparatus is included in the list, causing the terminal apparatus to release a Packet Data Convergence Protocol Layer (PDCP) entity associated with the first DRB identity and indicate to a Service Data Adaptation Protocol (SDAP) layer information of the DRB corresponding to the first DRB identity.

Note that these comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to one aspect of the present invention, a terminal apparatus can efficiently perform communication by reducing complexity of protocol processing.

BRIEF DESCRIPTION OF DRAWINGS

FIG. 6 is a diagram illustrating an example of information relating to a DRB configuration and an Abstract Syntax Notation One (ASN.1) description of information according to Embodiment 1 to Embodiment 3 of the present invention.

FIG. 18 is a diagram illustrating an example of information relating to a DRB configuration and an Abstract Syntax Notation One (ASN.1) description of information according to Embodiment 4 of the present invention.

FIG. 19 is a diagram illustrating an example of information relating to a cell group configuration and an Abstract Syntax Notation One (ASN.1) description of information according to Embodiment 4 of the present invention.

DESCRIPTION OF EMBODIMENTS

Hereinafter, embodiments of the present invention will be described in detail with reference to the drawings.

LTE (and LTE-A Pro) and NR may be defined as different RATs. The NR may be defined as a technology included in the LTE. The LTE may be defined as a technology included in the NR. In addition, the LTE that is connectable to the NR using Multi RAT Dual connectivity may be distinguished from the existing LTE. The present embodiment may be applied to the NR, the LTE and other RATs. Terms associated with the LTE and the NR are used in the following description. However, the present invention may be applied to other technologies using other terms. In the present embodiment, the term "E-UTRA" may be replaced with "LTE," and the term "LTE" may be replaced with "E-UTRA".

Figure 1:
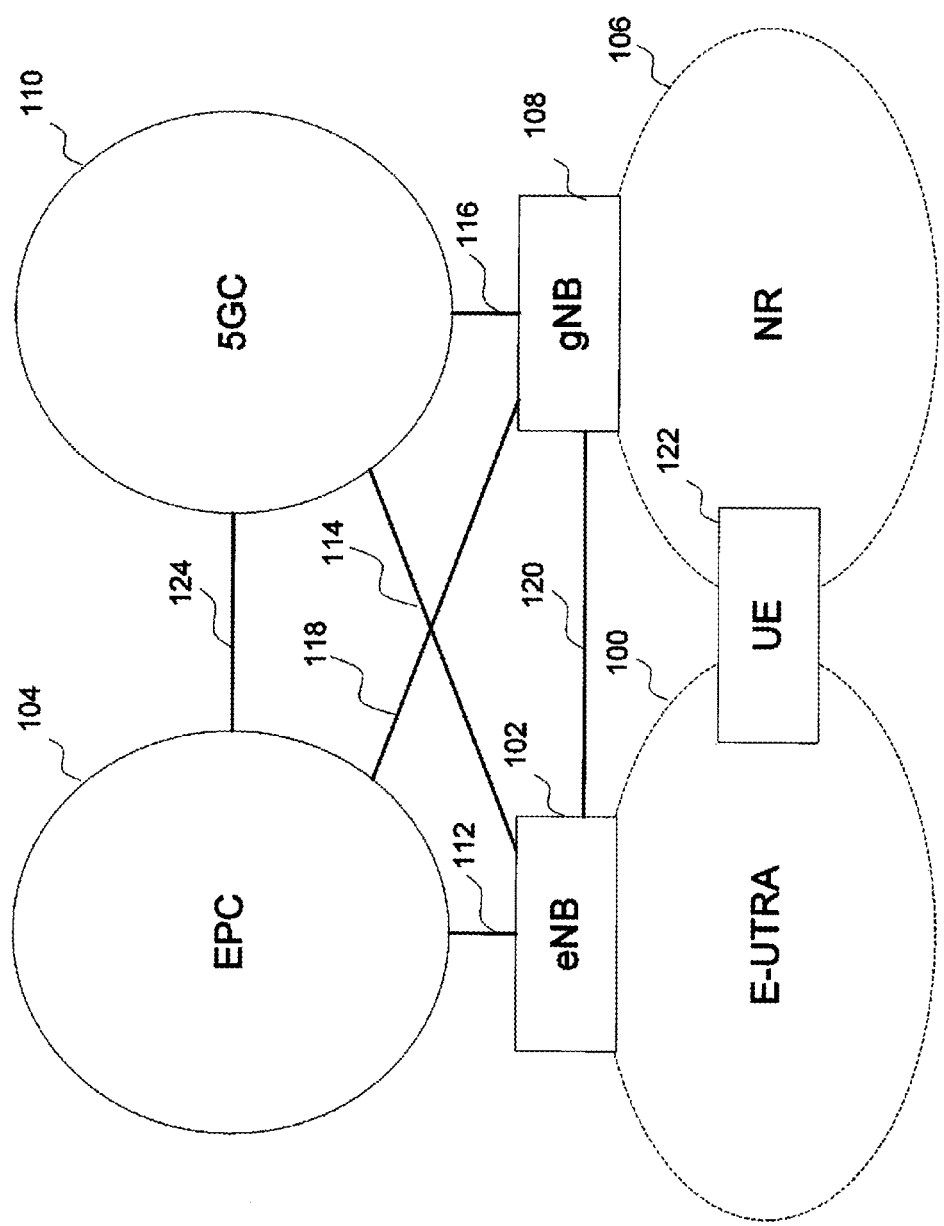
FIG. 1 is a schematic diagram of a communication system according to each of embodiments of the present invention.

FIG. 1 is a schematic diagram of a communication system according to an embodiment of the present invention.

An E-UTRA 100 is a radio access technology described in NPL 3 or the like, and includes a Cell Group (CG) configured in one or multiple frequency bands. An E-UTRAN Node B (eNB) 102 is a base station apparatus of the E-UTRA. An Evolved Packet Core (EPC) 104 is a core network described in NPL 14 or the like and is designed as a core network for the E-UTRA. An interface 112 is an interface between the eNB 102 and the EPC 104, where there is a control plane (CP) through which control signals are transferred and a user plane (UP) through which user data is transferred.

An NR 106 is a new radio access technology that is currently being studied by the 3GPP and includes Cell Groups (CGs) that are configured in one or multiple frequency bands. A gNode B (gNB) 108 is an NR base station apparatus. A 5GC 110 is a new core network for the NR that is currently being studied by 3GPP, and is described in NPL 2 and the like.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces that transfer CP only, UP only, or both the CP and the UP. Furthermore, the interface 114, the interface 116, the interface 118, the interface 120, and the interface 124 may not exist depending on communication systems provided by network operators.

A UE 122 is a terminal apparatus supporting the NR or both the E-UTRA and the NR.

Figure 2:
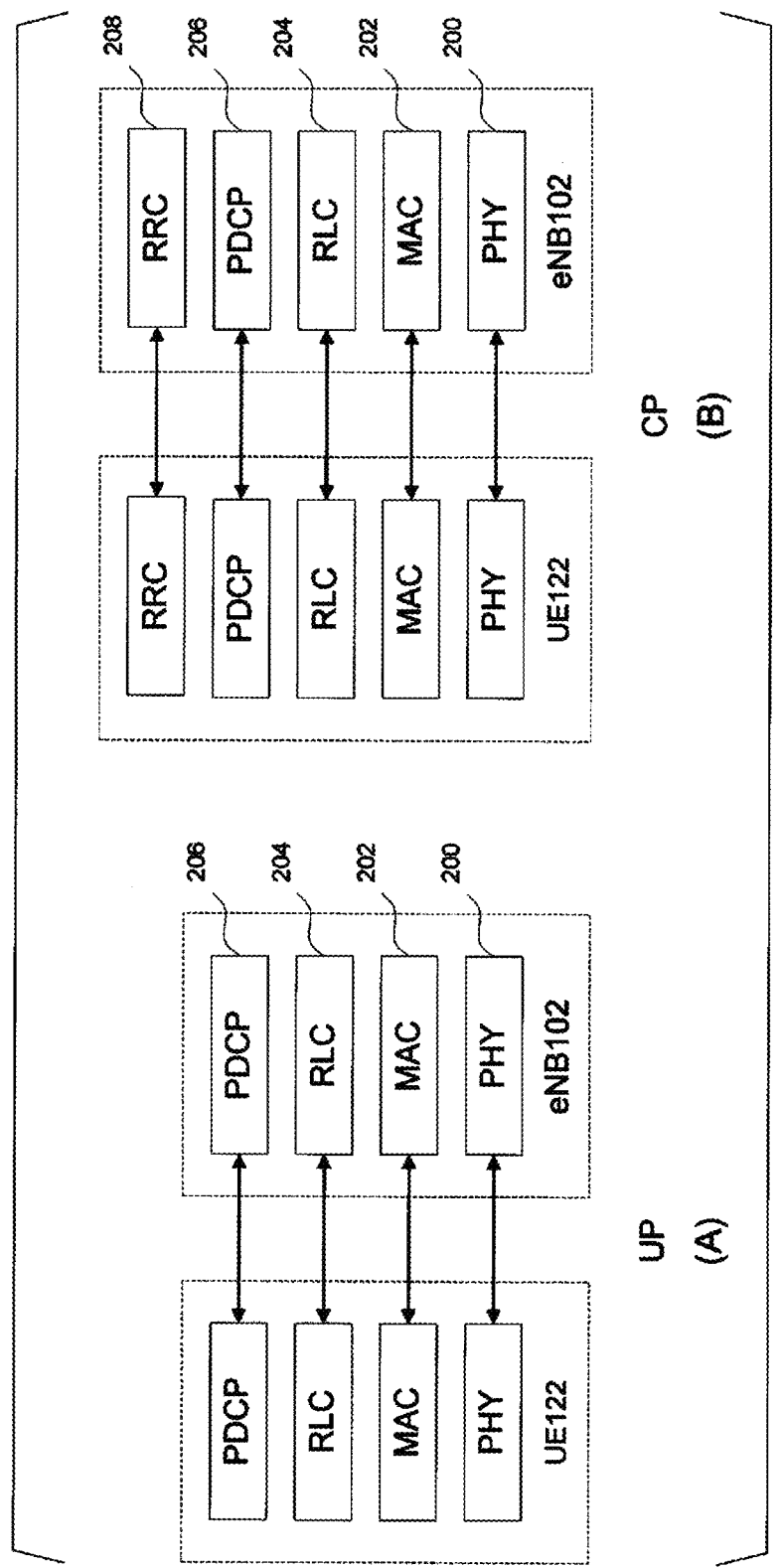
FIG. 2 is a diagram of protocol stacks of a UP and a CP of a terminal apparatus and a base station apparatus in E-UTRA according to each of the embodiments of the present invention.

FIG. 2 is a diagram of Protocol Stacks of UP and CP of a terminal apparatus and a base station apparatus in an E-UTRA radio access layer according to an embodiment of the present invention.

FIG. 2(A) is a diagram of the protocol stack of the UP used in a case that the UE 122 communicates with the eNB 102.

A Physical layer (PHY) 200 is a radio physical layer, and provides a transmission service to a higher layer by using a Physical Channel. The PHY 200 is connected with a Medium Access Control layer (MAC) 202 of a higher layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that maps various Logical Channels to various transport channels. The MAC 202 is connected with a Radio Link Control Layer (RLC) 204 of a higher layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a Random Access procedure, a function of reporting transmit power information, a function of performing HARQ control, and the like (NPL 7).

The RLC 204 is a radio link control layer that divides (Segmentation) the data received from a Packet Data Convergence Protocol Layer (PDCP) 206 of a higher layer to be described below, and adjusts the data size such that a lower layer can properly perform data transmission. Furthermore, the RLC 200 also has a function of ensuring Quality of Service (QoS) required for each piece of data. In other words, the RLC 204 has a function of data retransmission control or the like (NPL 6).

The PDCP 206 is a packet data convergence protocol layer for efficiently transmitting IP Packets being user data in a radio section. The PDCP 206 may have a header compression function of compressing unnecessary control information. Furthermore, the PDCP 206 may also have a data encryption function (NPL 5).

Note that data processed in the MAC 202, the RLC 204, and the PDCP 206 are referred to as a MAC Protocol Data Unit (PDU), an RLC PDU, and a PDCP PDU, respectively. In addition, data delivered from a higher layer to the MAC 202, the RLC 204, and the PDCP 206 or data delivered therefrom to a higher layer are respectively referred to as a MAC Service Data Unit (SDU), an RLC SDU, and a PDCP SDU.

FIG. 2(B) is a diagram of the protocol stack of the CP used in a case that the UE 122 communicates with the eNB 102.

In addition to the PHY 200, the MAC 202, the RLC 204, and the PDCP 206, there is a Radio Resource Control layer (RRC) 208 in the protocol stack of the CP. The RRC 208 is a radio link control layer that controls logical channels, transport channels, and physical channels by configuring and reconfiguring Radio Bearers (RBs) and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Note that an IP layer and a Transmission Control Protocol (TCP) layer, a User Datagram Protocol (UDP) layer, an application layer, and the like that are higher layers than the IP layer are higher layers than a PDCP layer (not illustrated). Further, an RRC layer and a Non Access Strarum (NAS) layer are also higher layers than an SDAP layer. In other words, the PDCP layer is a lower layer than the RRC layer, the NAS layer, and the IP layer, and a Transmission Control Protocol (TCP) layer, a User Datagram Protocol (UDP) layer, and an application layer that are higher than the IP layer.

Figure 3:
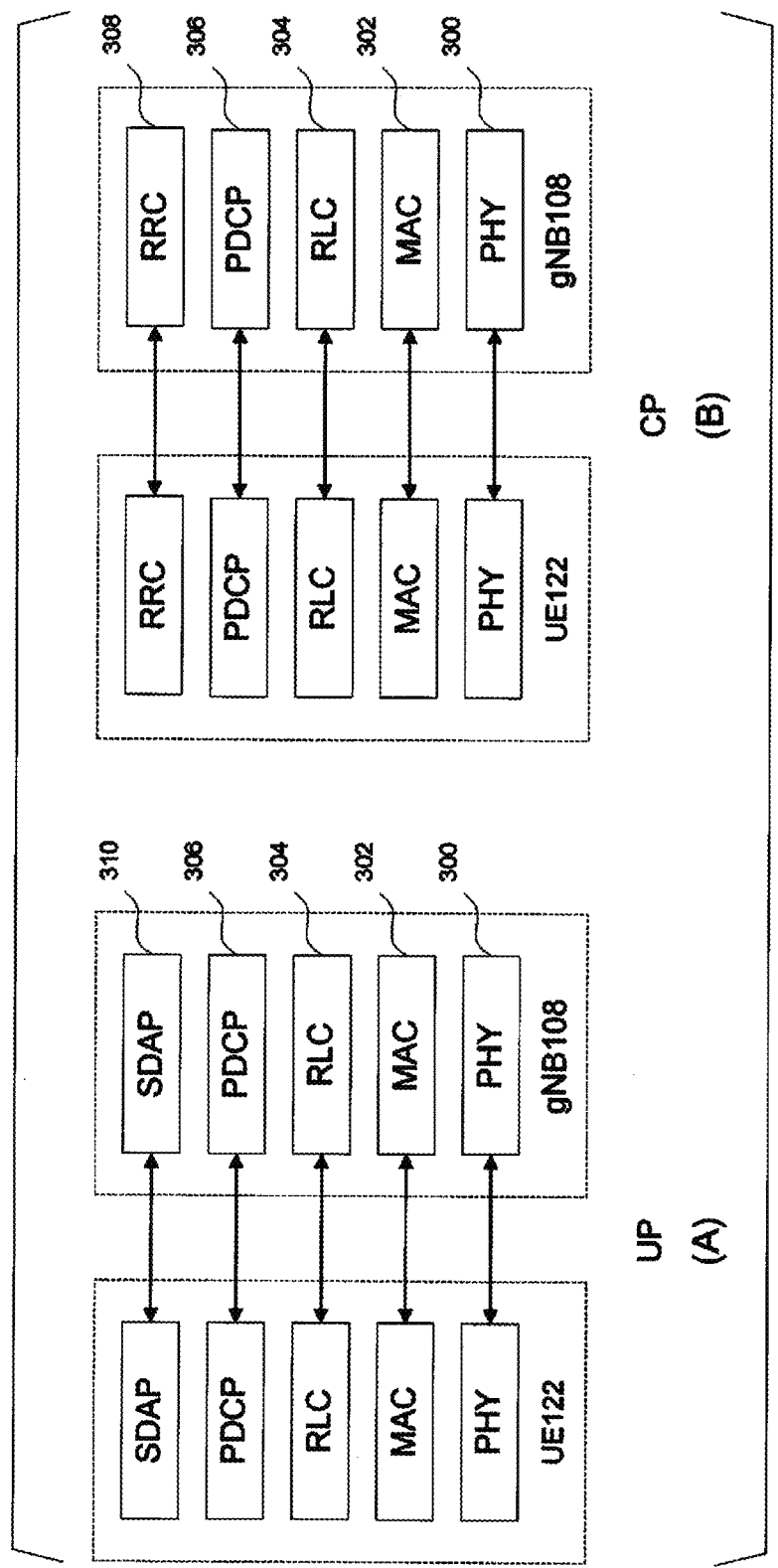
FIG. 3 is a diagram of protocol stacks of the UP and the CP of the terminal apparatus and the base station apparatus in NR according to each of the embodiments of the present invention.

FIG. 3 is a diagram of Protocol Stacks of UP and CP of a terminal apparatus and a base station apparatus in an NR radio access layer according to an embodiment of the present invention.

FIG. 3(A) is a diagram of the protocol stack of the UP used in a case that the UE 122 communicates with the gNB 108.

A Physical layer (PHY) 300 is a radio physical layer of the NR and may provide a transmission service to a higher layer by using the Physical Channel. The PHY 300 may be connected with the Medium Access Control layer (MAC) 302 of a higher layer to be described below via the Transport Channels. Data may be exchanged between the MAC 302 and the PHY 300 via the transport channels. The data may be transmitted and/or received between the PHYs of the UE 122 and the gNB 108 via the radio physical channel.

The MAC 302 is a medium access control layer that maps various Logical Channels to various transport channels. The MAC 302 may be connected with a Radio Link Control layer (RLC) 304 of a high layer to be described below via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the Random Access procedure, a function of reporting the transmit power information, a function of performing the HARQ control, and the like (NPL 13).

The RLC 304 is a radio link control layer that divides (Segmentation) the data received from a Packet Data Convergence Protocol Layer (PDCP) 206 of a higher layer to be described below, and adjusts the data size such that a lower layer can properly perform data transmission. Furthermore, the RLC 304 may also have a function of ensuring Quality of Service (QoS) required for each piece of data. In other words, the RLC 304 may have a function of data retransmission control or the like (NPL 12).

A PDCP 306 is a packet data convergence protocol layer that efficiently transmits IP Packet being user data in a radio section. The PDCP 306 may have a header compression function of compressing unnecessary control information. Furthermore, the PDCP 306 may also have a data encryption function (NPL 11).

A Service Data Adaptation Protocol (SDAP) 310 is a service data adaptation protocol layer that has a function of mapping a QoS flow of a downlink transmitted from a core network to a terminal apparatus through a base station apparatus and a DRB, mapping a QoS information flow of an uplink transmitted from the terminal apparatus to the core network through the base station apparatus and the DRB, and storing mapping rule information (NPL 16). The QoS flow includes one or multiple Service Data Flows (SDFs) processed using the same QoS policy (NPL 2). In addition, the SDAP may have a Reflective QoS function of mapping the QoS flow of the uplink and the DRB based on information of the QoS flow of the downlink (NPL 2 and NPL 16). Details are under discussion by 3GPP.

Note that an IP layer and a Transmission Control Protocol (TCP) layer, a User Datagram Protocol (UDP) layer, an application layer, and the like that are higher layers than the IP layer are higher layers than the SDAP layer (not illustrated). Further, an RRC layer and a Non Access Strarum (NAS) layer are also higher layers than the SDAP layer. In the NAS layer, the service data flow and the QoS flow are associated with each other. In other words, the SDAP layer is a lower layer than the RRC layer, the NAS layer, and the IP layer, and a Transmission Control Protocol (TCP) layer, a User Datagram Protocol (UDP) layer, and an application layer that are higher than the IP layer.

Note that the data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. In addition, the data delivered from higher layers to the MAC 202, the RLC 204, and the PDCP 206 or data delivered to higher layers therefrom may be respectively referred to as a MAC Service Data Unit (SDU), an RLC SDU, a PDCP SDU, and an SDAP SDU.

FIG. 3(B) is a diagram of the protocol stack of the CP used in a case that the UE 122 communicates with the gNB 108.

In addition to the PHY 300, the MAC 302, the RLC 304, and the PDCP 306, there is a Radio Resource Control layer (RRC) 308 in the protocol stack of the CP. The RRC 308 is a radio link control layer that controls logical channels, transport channels, and physical channels by configuring and reconfiguring Radio Bearers (RBs) and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122. Further, a part of the RBs including the RLC 304 and the MAC 302 may be referred to as an RLC bearer (NPL 10).

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that, hereinafter, in an embodiment of the present invention, in order to distinguish an E-UTRA protocol and an NR protocol from each other, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2.

Embodiment 1

Embodiment 1 of the present invention will be described with reference to FIG. 1, FIG. 2, and FIGS. 4 to 8.

Figure 4:
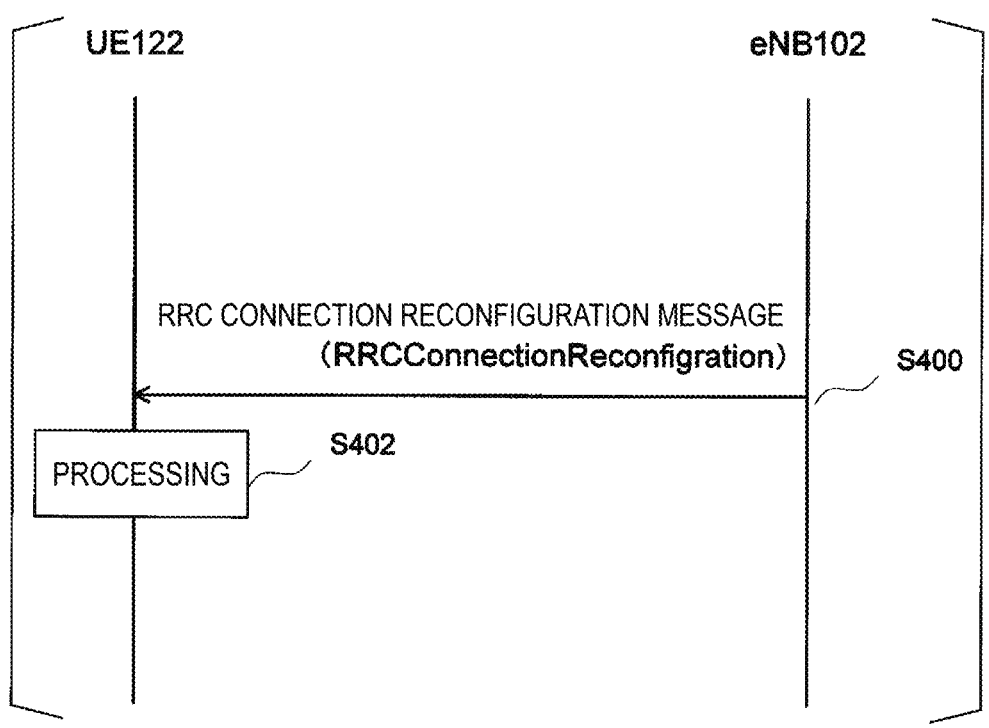
FIG. 4 is a diagram illustrating an example of a flow of an RRC connection reconfiguration procedure according to Embodiment 1 to Embodiment 3 of the present invention.

FIG. 4 is a diagram illustrating an example of a flow of an RRC connection reconfiguration procedure according to Embodiment 1 to Embodiment 3 of the present invention.

The RRC connection reconfiguration procedure (RRC Connection Reconfiguration) is a procedure used for handover, Measurement, and the like in addition to establishment, change, and release of an RB, a change, release, and the like of a secondary cell in LTE described in NPL 4. In addition, in the MR-DC, particularly in E-UTRA-NR Dual Connectivity (EN-DC) and NG-RAN E-UTRA-NR Dual Connectivity (NGEN-DC), the RRC connection reconfiguration procedure is used not only in LTE but also in NR to perform a part of handover, Measurement, and the like in addition to a part of establishing, changing, and releasing of a RB and changing, releasing, and the like of a secondary cell in NR, which is described in NPL 10. The EN-DC is a MR-DC in a case that the core network is the EPC 104, and the master node is the eNB 102. The NGEN-DC is a MR-DC in a case that the core network is 5GC 110 and the master node is the eNB 102. In each of the embodiments of the present invention, although the procedure used for establishing, changing, and releasing of the RB and adding, changing, releasing, handover, Measurement, and the like of the cell group in the NR is referred to as an RRC connection reconfiguration procedure, a different designation may be used. In addition, in each of the embodiments of the present invention, the procedure of establishing, changing, and releasing of the RB and adding, changing, releasing, handover, Measurement, and the like of the cell group may be a procedure in the NR described in NPL 10 and may be designated as an RRC reconfiguration procedure. Further, in each of the embodiments of the present invention, an RRC connection reconfiguration message (RRCConnectionReconfigration) that is transmitted from the eNB 102 to the UE 122 may be replaced by an RRC reconfiguration message RRCReconfigration) that is transmitted from the gNB 108 to the UE 122.

In the RRC connection reconfiguration procedure, the UE 122 receives an RRC Connection Reconfiguration message (RRCConnectionReconfiguration) from the eNB 102 (step S400) and performs processing of various configurations, for example, configuration of the DRB and the like based on information included in the RRC connection reconfiguration message (Step S402). After Step S402, the UE 122 may transmit an RRC connection reconfiguration completion message (RRCConnectionReconfigrationComplete) and the like to the eNB 102 (not illustrated).

Figure 5:
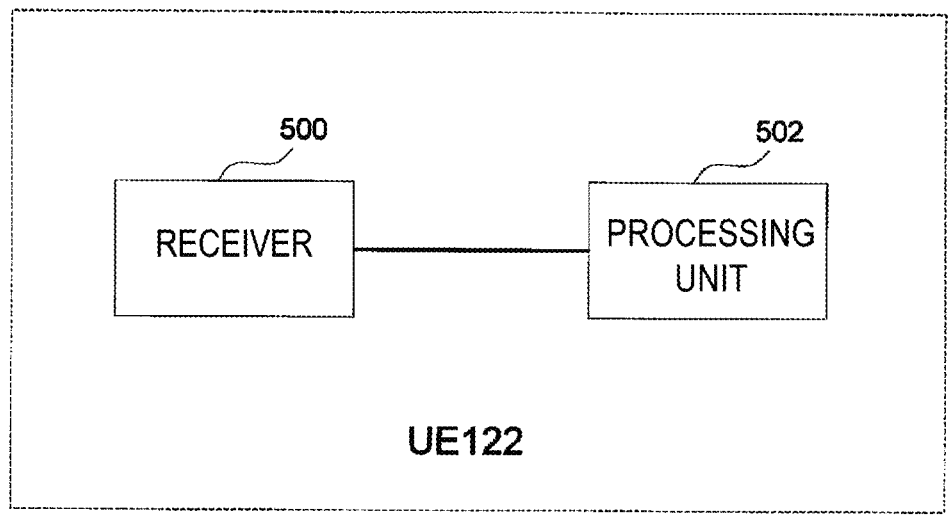
FIG. 5 is a block diagram illustrating a configuration of the terminal apparatus according to Embodiment 1 to Embodiment 3 of the present invention.

FIG. 5 is a block diagram illustrating a configuration of the terminal apparatus (UE 122) according to Embodiment 1 to Embodiment 3 of the present invention. Note that FIG. 5 illustrates only the main components closely related to one aspect of the present invention in order to avoid complexity of description.

The UE 122 illustrated in FIG. 5 includes a receiver 500 configured to receive the RRC connection reconfiguration message from the eNB 102 and a processing unit 502 configured to process a message.

FIG. 6 is one example of information relating to LTE in a DRB configuration for a cell group of a master node in the EN-DC and the NGEN-DC, the DRB configuration being part of information included in the RRC connection reconfiguration message illustrated in FIG. 4, and an Abstract Syntax Notation One (ASN.1) description of information according to Embodiment 1 to Embodiment 3 of the present invention. In the 3GPP, in the specifications relating to the RRC (NPL 4 and NPL 10), a message, information (Information Element: IE), and the like relating to the RRC are described using ASN.1. In the example of ASN.1 illustrated in FIG. 6, <omitted> and <partly omitted> are not part of the notation of ASN.1 and mean that other information is omitted. Note that there may also be omitted information in a part where neither <omitted> nor <partly omitted> is indicated. Note that the example of ASN.1 illustrated in FIG. 6 does not correctly follow the ASN.1 notation method but is an example notation of parameters for the DRB configuration according to one aspect of the present invention, and other designations and other notations may be used. In addition, in order to avoid complexity of description, the example of ASN.1 illustrated in FIG. 6 represents only an example relating to main information that is closely related to one aspect of the present invention.

Further, an Evolved Packet System (EPS) bearer to be used in the following description uniquely identifies a traffic flow that receives common QoS between the UE 122 and the EPC 104, and the EPS bearer identity is an identity used to identify each individual EPS bearer.

Information denoted by fullConfig in FIG. 6 is information for indicating that a full configuration is applied, and the application of the full configuration may be indicated using true, enable, or the like. Information denoted by DRB-ToAddModList may be a list of information for indicating a configuration of the DRB to be added or changed that is denoted by DRBToAddMod. Information denoted by eps-BearerIdentity included in DRB-ToAddMod (the information for indicating a configuration of the DRB to be added or changed) may be information of an Evolved Packet System (EPS) bearer identity for identifying an EPS bearer described in NPL 3. In the example illustrated in FIG. 6, although eps-BearerIdentity is configured to be an integer value in the range of 0 to 15, other values may be configured. The information of the EPS bearer identity may correspond to the DRB to be configured on a one-to-one basis. Information denoted by DRB-Identity included in the information for indicating the configuration of the DRB to be added or changed is information of the DRB identity of the DRB to be added or changed. In the example illustrated in FIG. 6, although DRB-Identity is configured to be an integer value in the range of 1 to 32, other values may be configured. Information denoted by pdcp-Config included in the information for indicating the configuration of the DRB to be added or changed may be information relating to a configuration of an LTE PDCP entity for establishing or changing the PDCP 206.

Some or all of the information illustrated in FIG. 6 may be optional. In other words, the information illustrated in FIG. 6 may be included in an RRC connection reconfiguration message when necessary. For example, in a case that an LTE PDCP is used as the PDCP of the DRB in the UE 122 corresponding to EN-DC, information relating to a configuration of the LTE PDCP entity may be included. In a case that an NR PDCP is used, information relating to the LTE PDCP entity may not be included.

Note that, in the UE 122, the configuration of the PDCP entity is configured using a corresponding RRC entity. In other words, the configuration of an LTE PDCP entity is configured using an RRC entity for LTE described in NPL 4, and the configuration of an NR PDCP entity is configured using an RRC entity for NR described in NPL 10. In addition, in a process performed by the RRC entity for LTE, whether the LTE PDCP is established or configured is determined. In a process performed by the RRC entity for NR, whether the NR PDCP is established or configured is determined. Note that, in a case that information of a configuration relating to NR such as information relating to the configuration of the NR PDCP entity is included in an RRC connection reconfiguration message received from the eNB 102 in the form of a container or the like, the UE 122 decodes the information using the RRC entity for NR and performs configuration.

Note that, hereinafter, in each of the embodiments of the present invention, the information relating to the configuration of the DRB to be added or changed may be referred to as a DRB configuration, the information of the EPS bearer identity may be referred to as an EPS bearer identity, the information of the DRB identity may be referred to as a DRB identity, and the information relating to the configuration of the LTE PDCP entity may be referred to as an LTE PDCP configuration.

Figure 7:
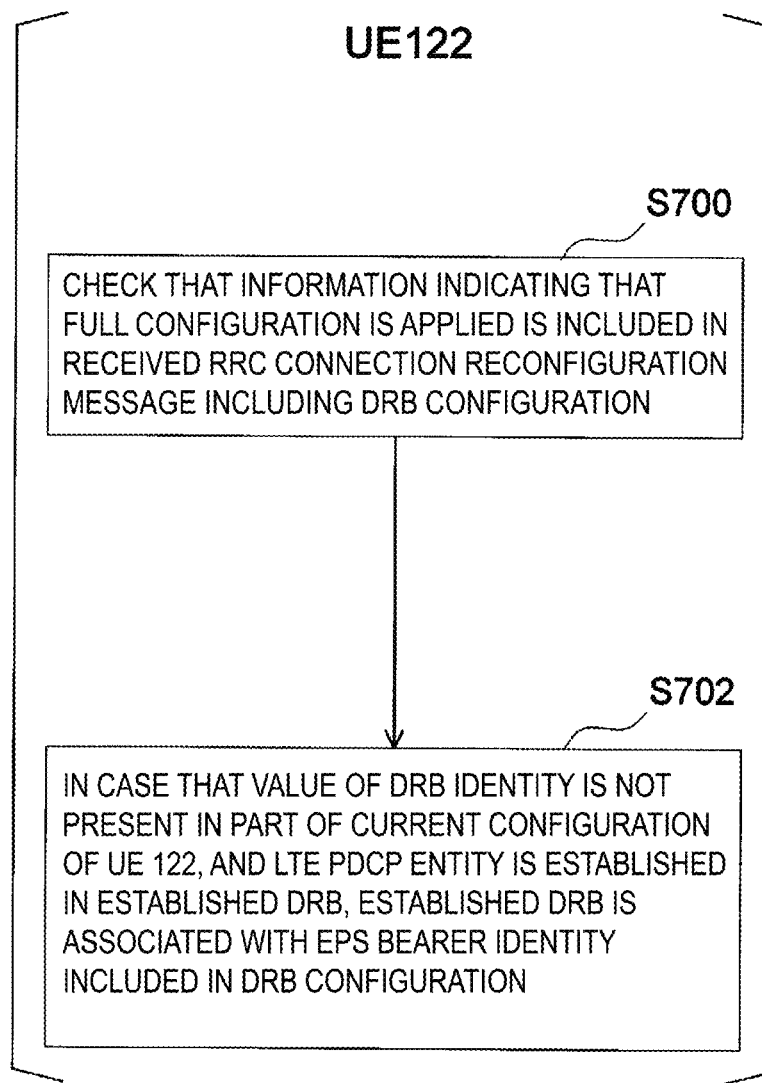
FIG. 7 is an example of a processing method according to Embodiment 1 of the present invention.
Figure 8:
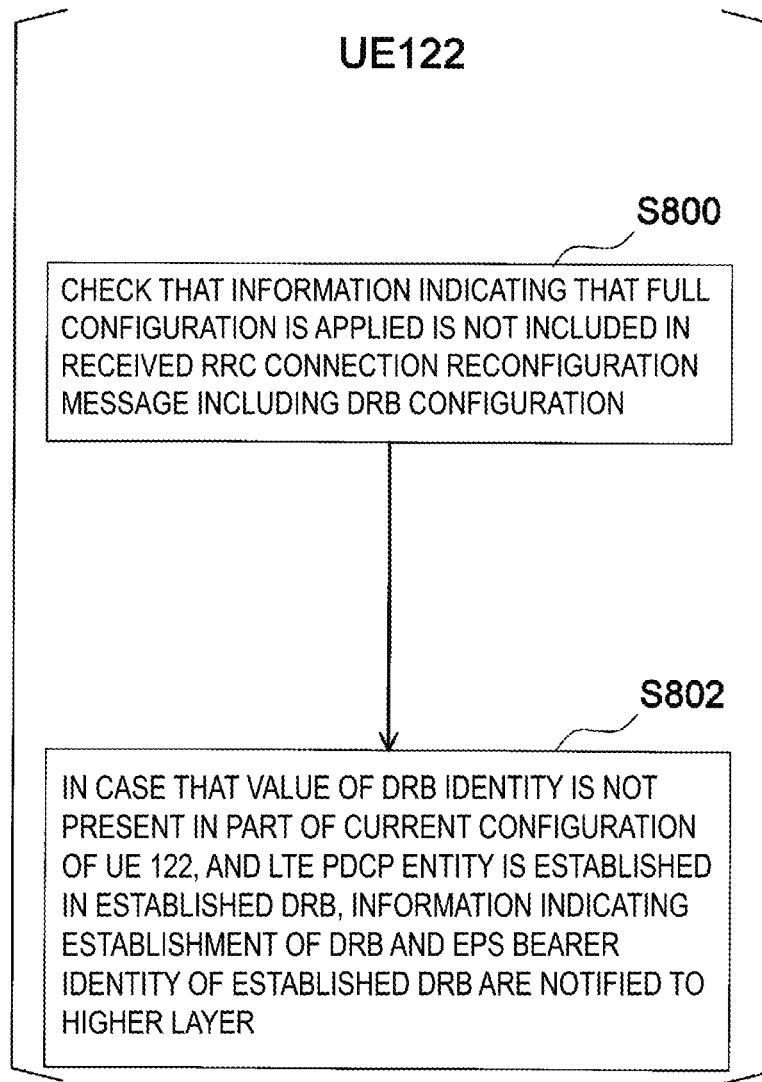
FIG. 8 is another example of a processing method according to Embodiment 1 of the present invention.

FIG. 7 illustrates an example of a processing method using the processing unit 502 of the UE 122 illustrated in FIG. 5 according to Embodiment 1 of the present invention, and FIG. 8 illustrates another example of a processing method using the processing unit 502 of the UE 122 illustrated in FIG. 5 according to Embodiment 1 of the present invention. Note that, in the description presented below, DRB configurations are included in a list of the DRB configuration, and processing for the DRB configuration in the processing unit 502 of the UE 122 is performed for each DRB configuration included in the list of the DRB configuration.

An example of a DRB configuration procedure will be described with reference to FIGS. 5 to 7.

The processing unit 502 of the UE 122 determines that information indicating that a full configuration is applied is included in an RRC connection reconfiguration message including the DRB configuration received from the receiver 500 (step S700).

Next, in a case that a value of the DRB identity included in the DRB configuration is not present in a part of the current configuration of the UE 122, and an LTE PDCP entity is established in an established DRB having the DRB identity, the processing unit 502 of the UE 122 associates the established DRB with the EPS bearer identity (step S702). In a case that a value of the DRB identity included in the DRB configuration is not present in a part of the current configuration of the UE 122, and an LTE PDCP entity is not established in an established DRB having the DRB identity, the processing unit 502 of the UE 122 does not associate the established DRB with the EPS bearer identity. Note that "a case that an LTE PDCP entity is established in an established DRB having the DRB identity" described above may be replaced with "a case that a PDCP entity has been established using LTE in an established DRB having the DRB identity" or may be replaced with "a case that an LTE PDCP entity configuration is included in the DRB configuration". Note that "a case that an LTE PDCP entity is established" represents a case that a PDCP entity is established in an RRC entity for LTE, and "an LTE PDCP configuration is included in the DRB configuration" indicates that a PDCP configuration is included in the DRB configuration of an RRC entity for LTE. Note that "a case that an LTE PDCP entity is not established in an established DRB having the DRB identity" described above may be replaced with "a case in a PDCP entity is not established using LTE in an established DRB having the DRB identity" or may be replaced with "a case that an LTE PDCP entity configuration is not included in the DRB configuration". Note that "a case that an LTE PDCP entity is not established" represents a case that a PDCP entity is not established in an RRC entity for LTE, and "an LTE PDCP configuration is not included in the DRB configuration" indicates that a PDCP configuration is not included in the DRB configuration of an RRC entity for LTE.

Note that each of pieces of information may be determined according to a different order from the order in FIG. 7. The determination of inclusion of information indicating that a full configuration is applied may be performed after determining that a value of information of the DRB identity is not present in a part of the current configuration of the UE 122 or determining that an LTE PDCP entity is established in Step S702.

Next, another example of the DRB configuration procedure will now be described with reference to FIG. 5, FIG. 6, and FIG. 8.

The processing unit 502 of the UE 122 checks that information indicating that a full configuration is applied is not included in an RRC connection reconfiguration message including the DRB configuration received from the receiver 500 (step S800).

Next, in a case that a value of the DRB identity included in the DRB configuration is not present in a part of the current configuration of the UE 122, and an LTE PDCP entity is established in an established DRB having the DRB identity, the processing unit 502 of the UE 122 indicates to a higher layer information indicating that the DRB is established and the EPS bearer identity of the established DRB (step S802). In a case that a value of the DRB identity included in the DRB configuration is not present in a part of the current configuration of the UE 122, and an LTE PDCP entity is not established in an established DRB having the DRB identity, the processing unit 502 of the UE 122 does not indicate to a higher layer information indicating that the DRB is established and the EPS bearer identity of the established DRB. Note that "a case that an LTE PDCP entity is established in an established DRB having the DRB identity" described above may be replaced with "a case that a PDCP entity has been established using LTE in an established DRB having the DRB identity" or may be replaced with "a case that an LTE PDCP entity configuration is included in the DRB configuration". Note that "a case that an LTE PDCP entity is established" represents a case that a PDCP entity is established in an RRC entity for LTE, and "an LTE PDCP configuration is included in the DRB configuration" indicates that a PDCP configuration is included in the DRB configuration of an RRC entity for LTE. Note that "a case that an LTE PDCP entity is not established in an established DRB having the DRB identity" described above may be replaced with "a case in a PDCP entity is not established using LTE in an established DRB having the DRB identity" or may be replaced with "a case that an LTE PDCP entity configuration is not included in the DRB configuration". Note that "a case that an LTE PDCP entity is not established" represents a case that a PDCP entity is not established in an RRC entity for LTE, and "an LTE PDCP configuration is not included in the DRB configuration" indicates that a PDCP configuration is not included in the DRB configuration of an RRC entity for LTE.

Note that each of pieces of information may be determined according to a different order from the order in FIG. 8. The determination of non-inclusion of information indicating that a full configuration is applied may be performed after determining that a value of the information of the DRB identity is not present in a part of the current configuration of the UE 122 or after determining that an LTE PDCP entity is established in step S802.

As described above, according to Embodiment 1 of the present invention, the terminal apparatus can efficiently perform communication by reducing complexity of protocol processing.

Embodiment 2

Embodiment 2 of the present invention will be described with reference to FIGS. 4 to 6 and FIGS. 9 to 12. Embodiment 2 will describe release processing of the DRB that occurs along with a PDCP version change from the LTE PDCP to the NR PDCP or from the NR PDCP to the LTE PDCP, or release processing of the DRB with the EPS bearer being maintained. Note that Embodiment 2 of the present invention may be applied in a case that the EN-DC is configured.

Figure 9:
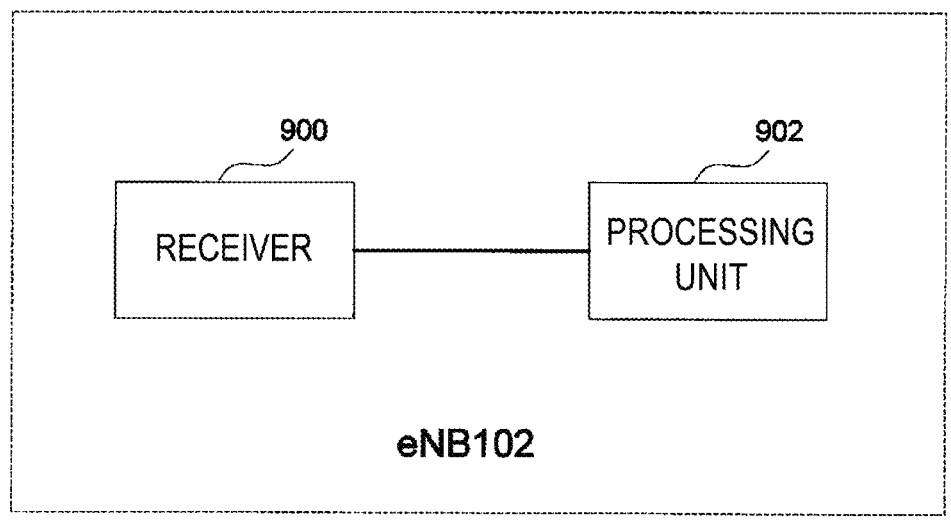
FIG. 9 is a block diagram illustrating a configuration of the base station apparatus according to each of the embodiments of the present invention.

FIG. 9 is a block diagram illustrating a configuration of the base station apparatus (eNB 102) according to Embodiment 1 to Embodiment 3 of the present invention. Note that FIG. 9 illustrates only the main components closely related to one aspect of the present invention in order to avoid complexity of description.

The eNB 102 illustrated in FIG. 9 includes a transmitter 900 configured to transmit the RRC connection reconfiguration message from the UE 122, and a processing unit 902 configured to create the RRC connection reconfiguration message.

The processing unit 902 of the eNB 102 creates the RRC connection reconfiguration message, and transmits the RRC connection reconfiguration message from the transmitter 900 to the UE 122 (Step S400). The receiver 500 of the UE 122 receives the RRC connection reconfiguration message, and the processing unit 502 performs processing according to the RRC connection reconfiguration message (Step S402).

Figure 10:
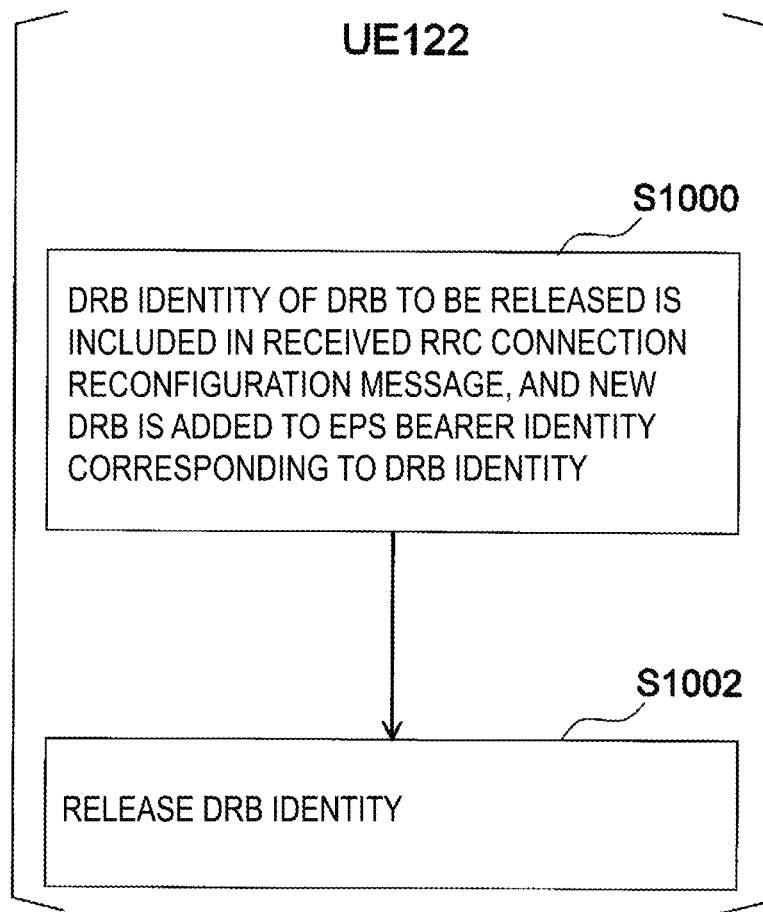
FIG. 10 is an example of a processing method according to Embodiment 2 of the present invention.
Figure 12:
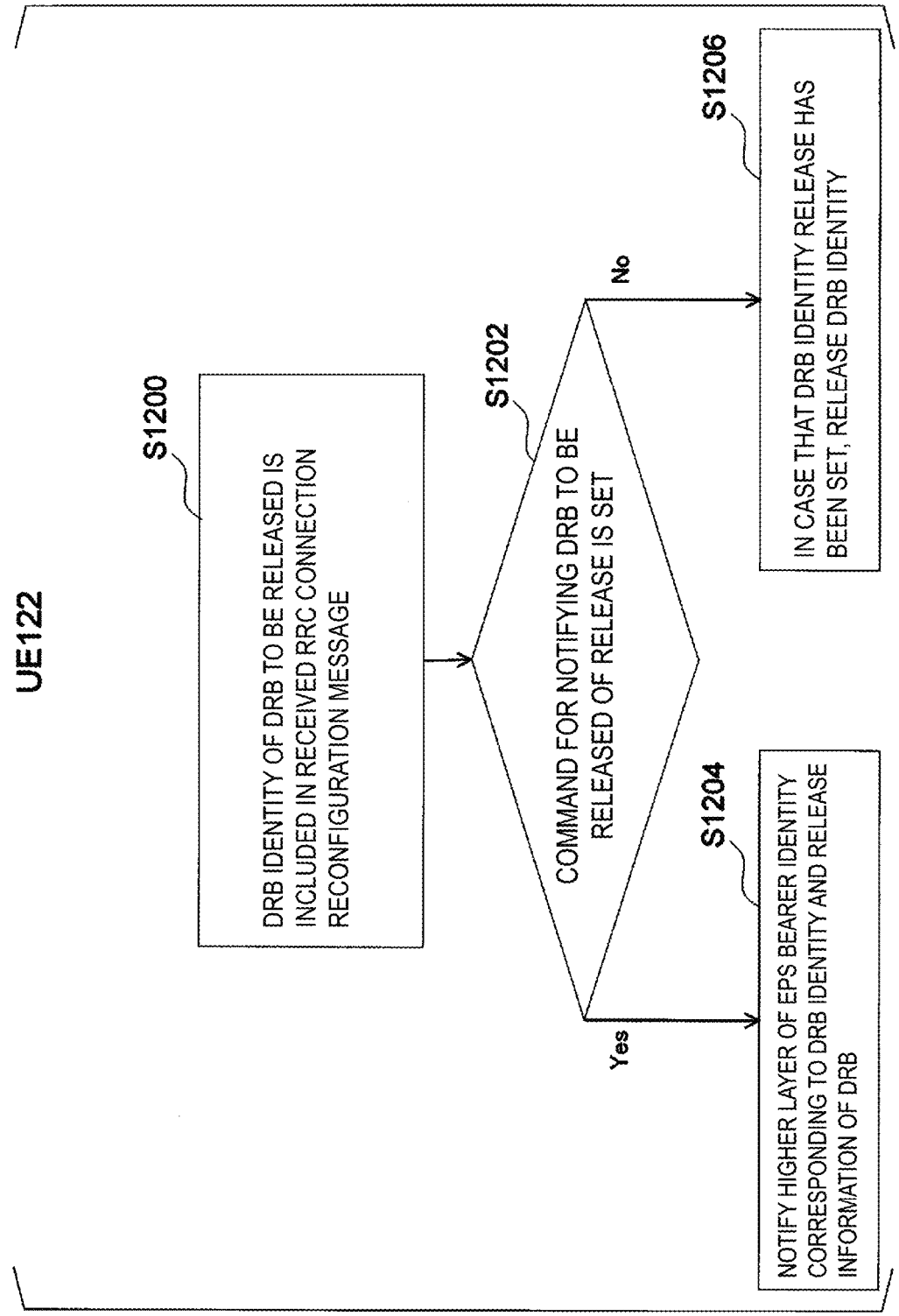
FIG. 12 is a third example of a processing method according to Embodiment 2 of the present invention.

FIG. 10 illustrates an example of a processing method using the processing unit 502 of the UE 122 illustrated in FIG. 5 according to Embodiment 2 of the present invention, FIG. 10 illustrates a second example of the processing method using the processing unit 502 of the UE 122 illustrated in FIG. 5 according to Embodiment 2 of the present invention, and FIG. 12 illustrates a third example of the processing method using the processing unit 502 of the UE 122 illustrated in FIG. 5 according to Embodiment 2 of the present invention. Note that, in the description presented below, DRB configurations are included in a list of the DRB configuration, and processing for the DRB configuration in the processing unit 502 of the UE 122 is performed for each DRB configuration included in the list of the DRB configuration.

In FIG. 10, the processing unit 502 of the UE 122 determines that the DRB identity of the DRB to be released is included in the RRC connection reconfiguration message received from the receiver 500, and a new DRB is to be added to the EPS bearer identity corresponding to the DRB identity. (Step S1000).

Next, the processing unit 502 of the UE 122 releases the DRB identity. (Step S1002). Further, in Step S1002, the processing unit 502 of the UE 122 may further transmit, to the NR RRC entity, an indication that a new DRB is to be established for the EPS bearer identity corresponding to the DRB identity.

Figure 11:
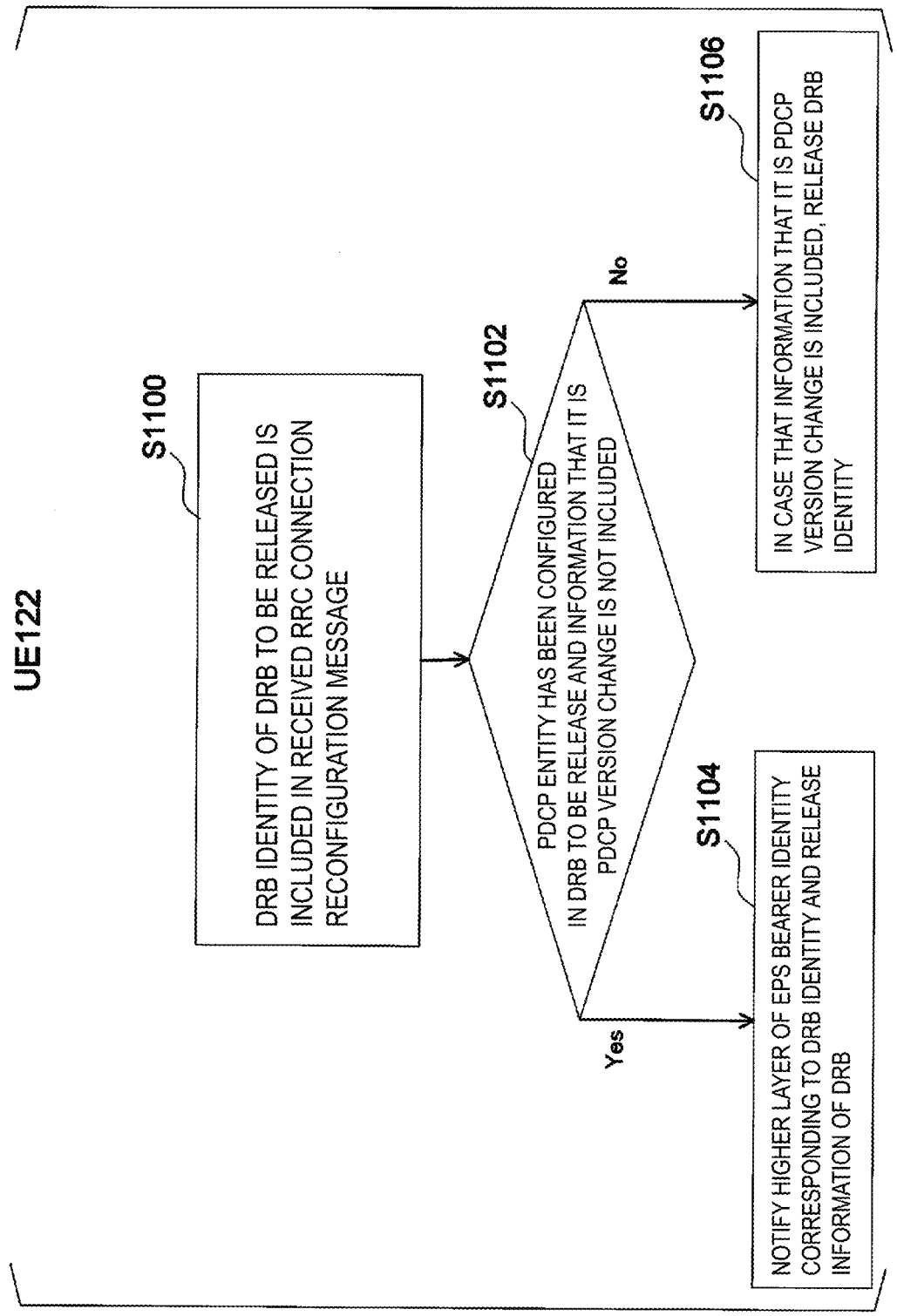
FIG. 11 is a second example of the processing method according to Embodiment 2 of the present invention.

In FIG. 11, the processing unit 502 of the UE 122 determines that a DRB identity of the DRB to be released is included in the RRC connection reconfiguration message received from the receiver 500. (Step S1100).

Next, the processing unit 502 of the UE 122 determines that the PDCP entity is configured in the DRB to be released and information (not illustrated in FIG. 6) that it is the PDCP version change is not included in the RRC connection reconfiguration message (Step S1102), and in a case that the processing unit 502 has successfully determined, the processing unit 502 indicates to a higher layer the EPS bearer identity corresponding to the DRB identity and release information of the DRB. (Step S1104).

In Step S1102, in a case that the processing unit 502 of the UE 122 cannot determine that the PDCP entity is configured in the DRB to be released and the information that it is the PDCP version change is not included in the RRC connection reconfiguration message, the processing unit 502 of the UE 122 determines that the information that it is the PDCP version change is included in the RRC connection reconfiguration message, and in a case that the processing unit 502 has successfully determined, the processing unit 502 releases the DRB identity (Step S1106).

In FIG. 12, the processing unit 502 of the UE 122 determines that a DRB identity of the DRB to be released is included in the RRC connection reconfiguration message received from the receiver 500. (Step S1200).

Next, the processing unit 502 of the UE 122 determines that a command (not illustrated in FIG. 6) for indicating the DRB to be released of the release is set (Step S1202), and in a case that the processing unit 502 has successfully determined, the processing unit 502 indicates to a higher layer the EPS bearer identity corresponding to the DRB identity and release information of the DRB. (Step S1204).

In Step S1202, in a case that the processing unit 502 of the UE 122 determines that the command for indicating the DRB to be released of the release is not set, the processing unit 502 determines whether or not a release command (not illustrated in FIG. 6) of the DRB identity is set for the DRB identity. In a case that the processing unit 502 has successfully determined, the processing unit 502 releases the DRB identity (Step S1206).

As described above, according to Embodiment 2 of the present invention, the terminal apparatus can efficiently perform communication by reducing complexity of protocol processing.

Embodiment 3

Embodiment 3 of the present invention will be described with reference to FIGS. 4 to 6, FIG. 9, and FIGS. 13 to 15. Embodiment 3 will describe DRB addition processing after the release of the DRB that occurs along with a PDCP version change from the LTE PDCP to the NR PDCP or from the NR PDCP to the LTE PDCP, or DRB addition processing after the release of the DRB with the EPS bearer being maintained. Note that Embodiment 3 of the present invention may be applied in a case that the EN-DC is configured.

FIG. 9 is a block diagram illustrating a configuration of the base station apparatus (eNB 102) according to Embodiment 1 to Embodiment 3 of the present invention. Note that FIG. 9 illustrates only the main components closely related to one aspect of the present invention in order to avoid complexity of description.

The eNB 102 illustrated in FIG. 9 includes a transmitter 900 configured to transmit the RRC connection reconfiguration message from the UE 122, and a processing unit 902 configured to create the RRC connection reconfiguration message.

The processing unit 902 of the eNB 102 creates the RRC connection reconfiguration message, and transmits the RRC connection reconfiguration message from the transmitter 900 to the UE 122 (Step S400). The receiver 500 of the UE 122 receives the RRC connection reconfiguration message, and the processing unit 502 performs processing according to the RRC connection reconfiguration message (Step S402).

Figure 13:
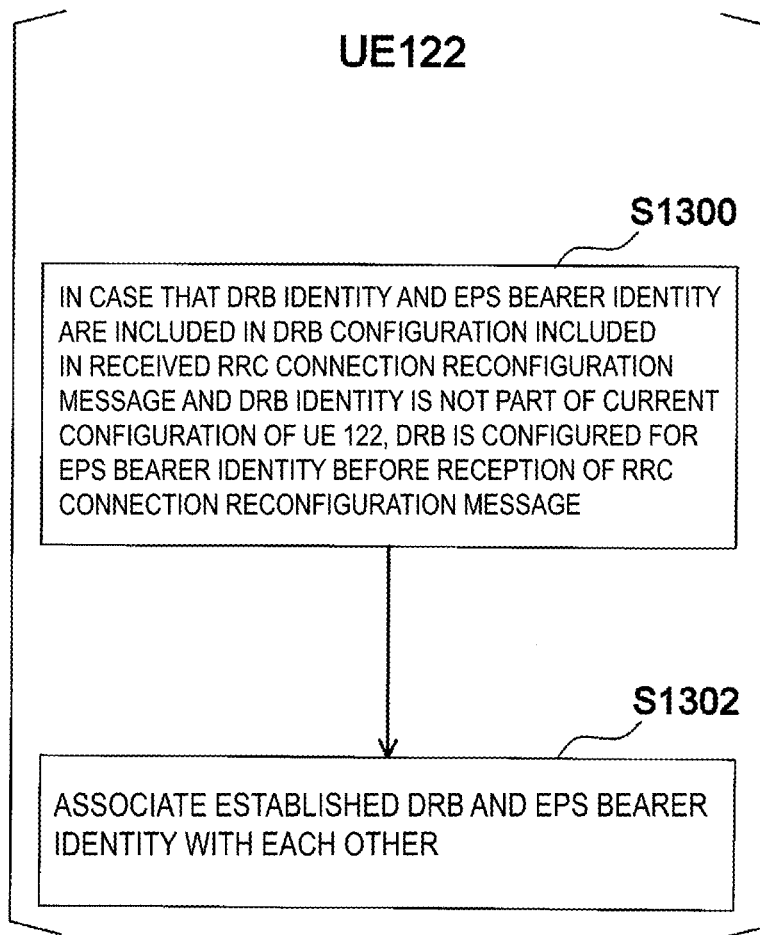
FIG. 13 illustrates an example of a processing method according to Embodiment 3 of the present invention.
Figure 14:
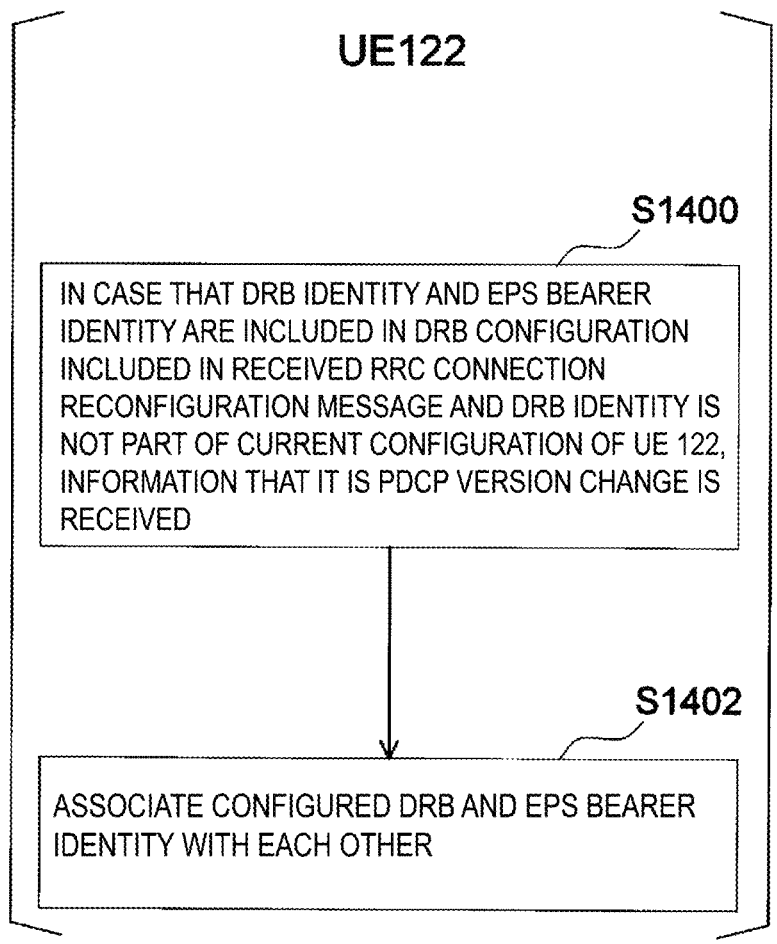
FIG. 14 is a second example of the processing method according to Embodiment 3 of the present invention.
Figure 15:
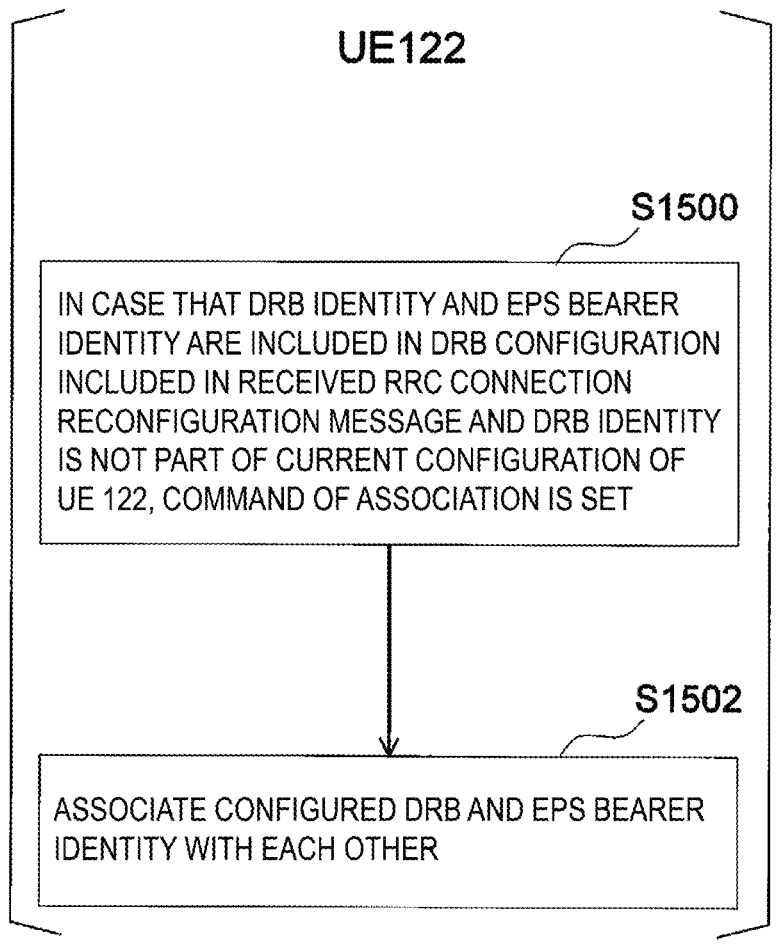
FIG. 15 is a third example of the processing method according to Embodiment 3 of the present invention.

FIG. 13 illustrates an example of a processing method using the processing unit 502 of the UE 122 illustrated in FIG. 5 according to Embodiment 3 of the present invention, FIG. 14 illustrates a second example of the processing method using the processing unit 502 of the UE 122 illustrated in FIG. 5 according to Embodiment 3 of the present invention, and FIG. 15 illustrates a third example of the processing method using the processing unit 502 of the UE 122 illustrated in FIG. 5 according to Embodiment 3 of the present invention. Note that, in the description presented below, DRB configurations are included in a list of the DRB configuration, and processing for the DRB configuration in the processing unit 502 of the UE 122 is performed for each DRB configuration included in the list of the DRB configuration.

In FIG. 13, the processing unit 502 of the UE 122 determines that the DRB configuration is included in the RRC connection reconfiguration message received from the receiver 500 and the DRB identity and the EPS bearer identity are included in the DRB configuration, and determines that the DRB identity is not part of the current configuration of the UE 122 and the DRB has been configured for the EPS bearer identity before the reception of the RRC connection reconfiguration message (Step S1300).

Next, the processing unit 502 of the UE 122 associates the established DRB and the EPS bearer according to the DRB configuration (Step S1302).

In FIG. 14, the processing unit 502 of the UE 122 determines that the DRB configuration is included in the RRC connection reconfiguration message received from the receiver 500 and the DRB identity and the EPS bearer identity are included in the DRB configuration, and determines that the DRB identity is not part of the current configuration of the UE 122 and information that it is the PDCP version change is included in the RRC connection reconfiguration message (Step S1400). In a case that the processing unit 502 of the UE 122 has successfully determined, the processing unit 502 associates the established DRB and the EPS bearer according to the DRB configuration (Step S1402).

In FIG. 15, the processing unit 502 of the UE 122 determines that the DRB configuration is included in the RRC connection reconfiguration message received from the receiver 500 and the DRB identity and the EPS bearer identity are included in the DRB configuration, and determines that the DRB identity is not part of the current configuration of the UE 122 and a command for association is set for the DRB configuration (Step S1500). In a case that the processing unit 502 of the UE 122 has successfully determined, the processing unit 502 associates the established DRB and the EPS bearer according to the DRB configuration (Step S1502).

As described above, according to Embodiment 3 of the present invention, the terminal apparatus can efficiently perform communication by reducing complexity of protocol processing.

Embodiment 4

Embodiment 4 of the present invention will be described with reference to FIG. 1, FIG. 2, and FIGS. 16 to 22. Note that Embodiment 4 according to the present invention may be used only in a case that the terminal apparatus does not enable the EN-DC, or may be used only in a case that the 5GC 110 is used as the core network. Further, Embodiment 4 according to the present invention may be used only in a case that the SDAP entity is configured in the terminal apparatus.

Figure 16:
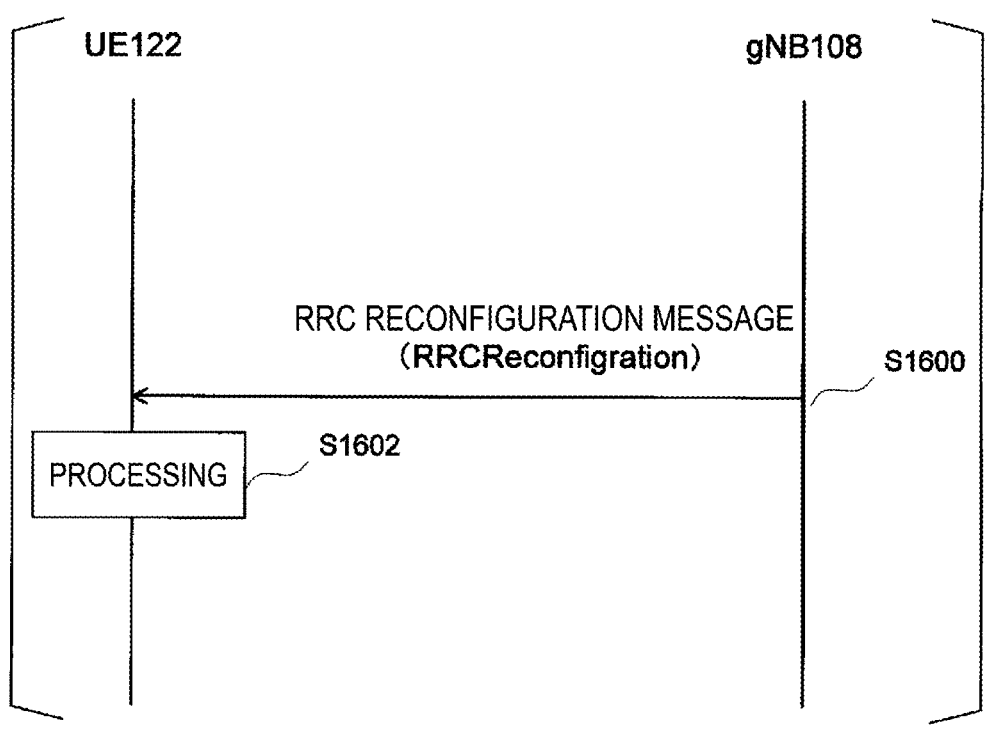
FIG. 16 is a diagram illustrating an example of a flow of an RRC reconfiguration procedure according to Embodiment 4 of the present invention.

FIG. 16 is a diagram illustrating an example of a flow of an RRC reconfiguration procedure according to Embodiment 4 of the present invention.

The RRC reconfiguration procedure (RRC Reconfiguration) is a procedure used for handover (reconfiguration involving synchronization), Measurement, and the like in addition to establishment, change, and release of an RB, a change, release, and the like of a secondary cell in NR described in NPL 10.

In the RRC reconfiguration procedure, the UE 122 receives an RRC reconfiguration message (RRCReconfigration) from the gNB 108 (step S1600) and performs processing of various configurations, for example, configuration of the DRB and the like based on information included in the RRC reconfiguration message (Step S1602). After Step S1602, the UE 122 may transmit an RRC reconfiguration completion message (RRCReconfigrationComplete) and the like to the gNB 108 (not illustrated).

Figure 22:
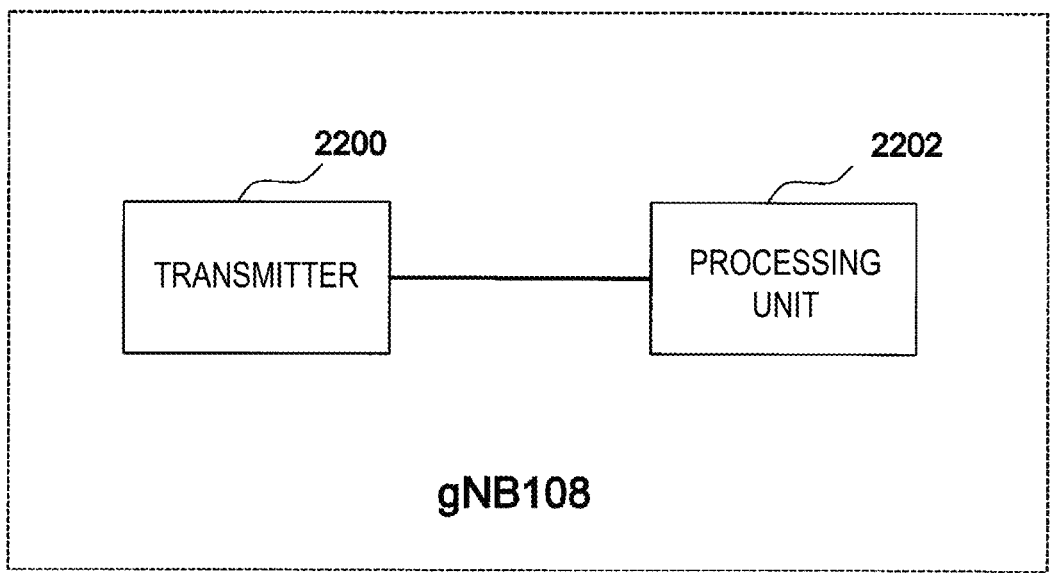
FIG. 22 is a block diagram illustrating a configuration of a base station apparatus according to Embodiment 4 of the present invention.

FIG. 22 is a block diagram illustrating a configuration of the base station apparatus (gNB) according to Embodiment 4 of the present invention. Note that FIG. 22 illustrates only the main components closely related to one aspect of the present invention in order to avoid complexity of description.

The gNB 108 illustrated in FIG. 22 includes a transmitter 2200 configured to transmit an RRC reconfiguration message to the UE 122, and a processing unit 2202 configured to cause the UE 122 to perform processing of a message.

Figure 17:
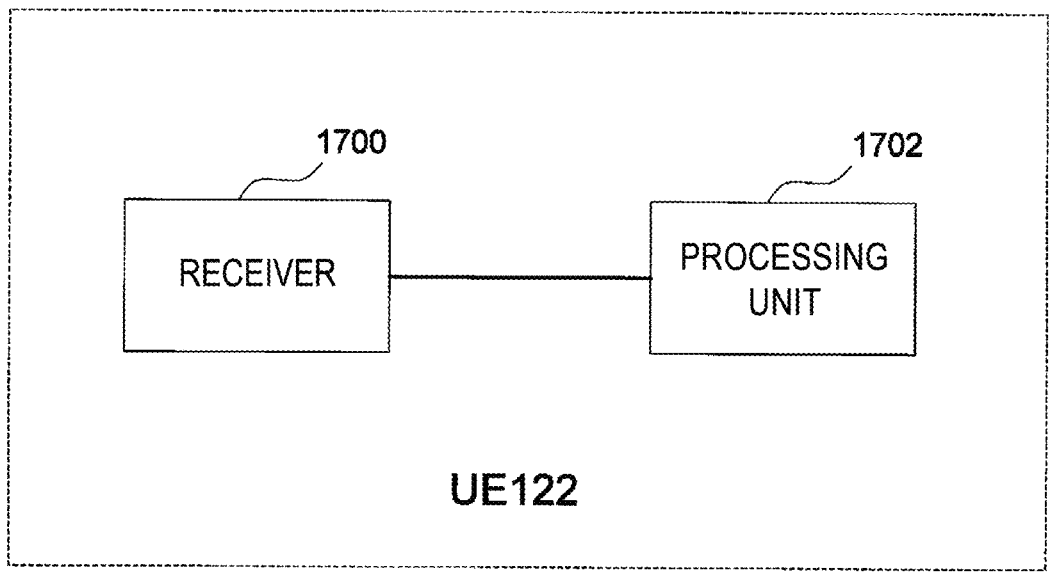
FIG. 17 is a block diagram illustrating a configuration of the terminal apparatus according to Embodiment 4 of the present invention.

FIG. 17 is a block diagram illustrating a configuration of the terminal apparatus (UE 122) according to Embodiment 4 of the present invention. Note that FIG. 17 illustrates only the main components closely related to one aspect of the present invention in order to avoid complexity of description.

The UE 122 illustrated in FIG. 17 includes a receiver 1700 configured to receive the RRC reconfiguration message from the gNB 108 and a processing unit 1702 configured to process a message.

FIG. 18 is an example of an Abstract Syntax Notation One (ASN.1) description representing the DRB configuration included in the RRC reconfiguration message of FIG. 16 according to Embodiment 4 of the present invention. In the 3GPP, in the specifications relating to the RRC (NPL 4 and NPL 10), a message, information (Information Element: IE), and the like relating to the RRC are described using ASN.1. In the example of ASN.1 illustrated in FIG. 18, <omitted> and <partly omitted> are not part of the notation of ASN.1 and mean that other information is omitted. Note that there may also be omitted information in a part where neither <omitted> nor <partly omitted> is indicated. Note that the example of ASN.1 illustrated in FIG. 18 does not correctly follow the ASN.1 notation method but is an example notation of parameters for the DRB configuration according to one aspect of the present invention, and other designations and other notations may be used. In addition, in order to avoid complexity of description, the example of ASN.1 illustrated in FIG. 18 represents only an example relating to main information that is closely related to one aspect of the present invention.

Information denoted by DRB-ToAddModList in FIG. 18 may be a list of information for indicating a configuration of the DRB to be added or changed that is denoted by DRB-ToAddMod. Information denoted by cnAssociation in DRB-ToAddMod (information for indicating the configuration of the DRB to be added or changed) may be information for indicating whether the DRB is associated with the information (eps-BearerIdentity) for indicating the EPS bearer identity described in Embodiments 1 to 3 or is associated with information (sdap-Config) for indicating an SDAP configuration. The information denoted by cnAssociation may be information for indicating whether the EPC 104 is used or indicating whether the 5GC 110 is used for the core network. In a case that the UE 122 is connected to the EPC, the DRB may be associated with the information (eps-BearerIdentity) for indicating the EPS bearer identity in cnAssociation, and in a case that the UE 122 is connected to the 5GC 110, the DRB may be associated with the information (sdap-Config) for indicating the SDAP configuration. In a case of the DC, the DRB identity is specific in a scope of the UE 122. Specifically, the information denoted by cnAssociation may include the information (eps-BearerIdentity) for indicating the EPS bearer identity in a case that the EPC 104 is used as the core network, and may include the information (sdap-Config) for indicating the SDAP configuration in a case that the 5GC 110 is used as the core network. Information for indicating the SDAP configuration may be information relating to a configuration of an SDAP entity for establishing or changing the SDAP 310. Information denoted by mappedQoS-FlowsToAdd that is included in the information for indicating the SDAP configuration may be information of a list of QoS Flow Identities (QFIs) of the QoS flow to be associated with (mapped to) the DRB to be added or changed or to be additionally associated. Further, information denoted by mappedQoS-FlowsToRelease that is included in the information for indicating the SDAP configuration may be information for indicating a list of QoS Flow Identities (QFIs) of the QoS flow whose association state is to be released from the QoS flow that is currently associated (mapped) to the DRB to be added or changed. Further, in addition to the above, information for indicating a PDU session identity, information for indicating that a header for the uplink is present, information for indicating that a header for the downlink is present, and the like may be included. Information denoted by DRB-Identity included in the information for indicating the configuration of the DRB to be added or changed is information of the DRB identity of the DRB to be added or changed. In the example illustrated in FIG. 18, although DRB-Identity is configured to be an integer value in the range of 1 to 32, other values may be configured. Information denoted by pdcp-Config included in the information for indicating the configuration of the DRB to be added or changed may be information relating to a configuration of an NR PDCP entity for establishing or changing the PDCP 306 for the SRB and the DRB. The information relating to the configuration of the NR PDCP entity may include information for indicating a size of a sequence number for the uplink, information for indicating a size of a sequence number for the downlink, information for indicating a profile of header compression (RObust Header Compression (RoHC)), re-ordering timer information, and the like. Further, information denoted by DRB-ToReleaseList may be information of a list of the DRB identities of DRBs to be released.

Some or all of the information illustrated in FIG. 18 may be optional. In other words, the information illustrated in FIG. 18 may be included in an RRC reconfiguration message when necessary.

FIG. 19 is an example of an Abstract Syntax Notation One (ASN.1) description representing information of a cell group configuration included in the RRC reconfiguration message of FIG. 16 according to Embodiment 4 of the present invention. In the example of ASN.1 illustrated in FIG. 19, <omitted> and <partly omitted> are not part of the notation of ASN.1 and mean that other information is omitted. Note that there may also be omitted information in a part where neither <omitted> nor <partly omitted> is indicated. Note that the example of ASN.1 illustrated in FIG. 18 does not correctly follow the ASN.1 notation method but is an example notation of parameters for the DRB configuration according to one aspect of the present invention, and other designations and other notations may be used. In addition, in order to avoid complexity of description, the example of ASN.1 illustrated in FIG. 19 represents only an example relating to main information that is closely related to one aspect of the present invention.

Information denoted by an SpCell in FIG. 19 may be configuration information of a special cell being a main carrier in a cell group. Information denoted by ReconfigurationWithSync in SpCellConfig is information for indicating that it is a reconfiguration involving synchronization. The reconfiguration involving synchronization refers to an operation performed in a case that synchronization with the special cell is necessary, and may include operations of, for example, starting synchronization with the downlink of a target special cell (spCell) in a case that the RRC reconfiguration message including reconfigrationWithSync is received, acquiring Master Information Blocks (MIBs) of the target special cell described above, resetting a MAC entity of a corresponding cell group, applying a value of a new terminal apparatus identity to a Cell Radio Network Temporary Identifier (C-RNTI) for the corresponding cell group described above, and configuring a lower layer in accordance with a received configuration condition.

Some or all of the information illustrated in FIG. 18 may be optional. In other words, the information illustrated in FIG. 18 may be included in an RRC reconfiguration message when necessary.

Figure 20:
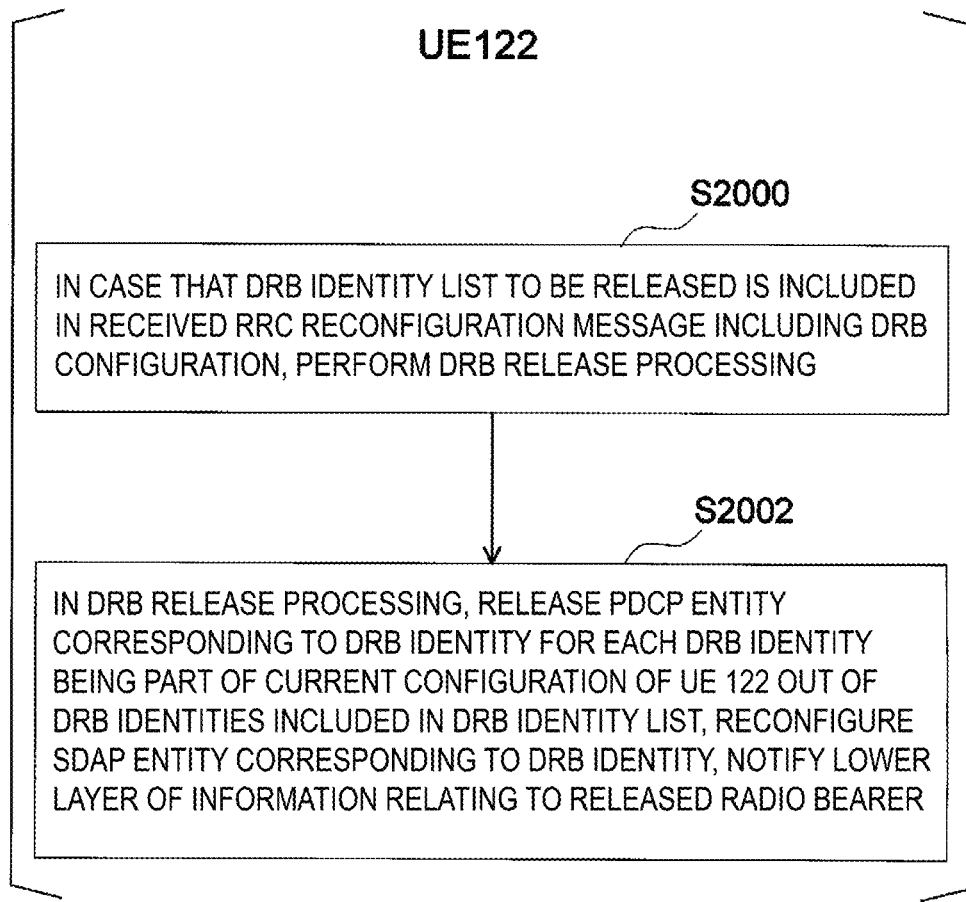
FIG. 20 is an example of a processing method according to Embodiment 4 of the present invention.
Figure 21:
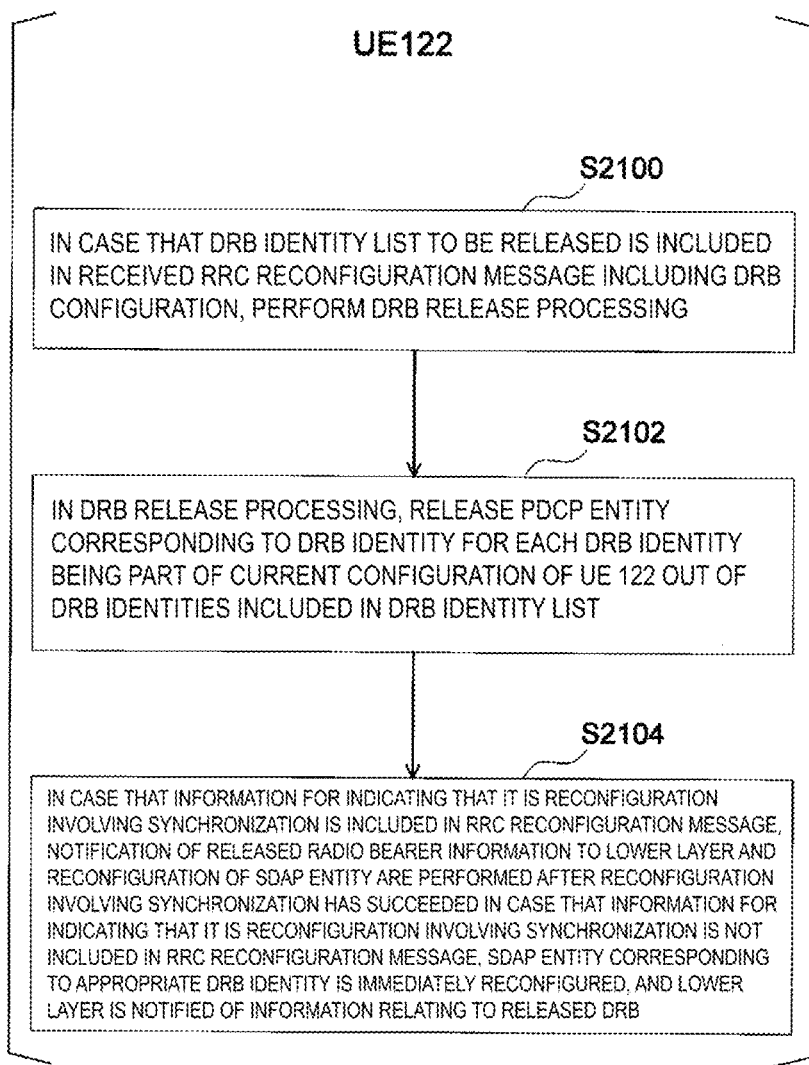
FIG. 21 is a second example of the processing method according to Embodiment 4 of the present invention.

FIG. 20 illustrates an example of a processing method using the processing unit 1702 of the UE 122 illustrated in FIG. 17 according to Embodiment 4 of the present invention, and FIG. 21 illustrates another example of the processing method using the processing unit 1702 of the UE 122 illustrated in FIG. 17 according to Embodiment 4 of the present invention. Note that, in description presented below, the DRB identity of the DRB to be released is included in the DRB list to be released, and processing for the DRB identity of the DRB to be released in the processing unit 1702 of the UE 122 is performed for each DRB identity included in the DRB list to be released.

An example of the DRB configuration procedure according to Embodiment 4 of the present invention will be described with reference to FIGS. 16 to 20 and FIG. 22.

The processing unit 2202 of the gNB 108 creates the RRC reconfiguration message including the DRB configuration including a list of a DRB identity of a DRB to be released, and transmits the RRC reconfiguration message from the transmitter 2200. The processing unit 1702 of the UE 122 determines whether or not the list of the DRB identity of the DRB to be released is included in the RRC reconfiguration message including the DRB configuration received from the receiver 1700, and in a case that the DRB identity list is included in the RRC reconfiguration message, the processing unit 1702 performs DRB release processing (Step S2000).

Next, in the DRB release processing described above, the processing unit 1702 of the UE 122 releases the PDCP entity corresponding to an appropriate DRB identity for each DRB identity being a part of the current configuration of the UE 122 out of the DRB identities included in the list of DRB identities described above, reconfiguring the SDAP entity corresponding to the appropriate DRB identity, and indicating to a lower layer information relating to the released DRB (Step S2002). Note that the lower layer may be interpreted as the SDAP layer.

Note that, in Step S2002, the reconfiguration of the SDAP entity may be performed only once for the release of the DRB corresponding to all of the DRB identities included in the list of the DRB identity of the DRB to be released. Further, to indicate to the lower layer the information relating to the released DRB may be the DRB identity of the released DRB. Further, the lower layer may be the SDAP layer. Further, either the reconfiguration of the SDAP entity or the indication of the information relating to the released DRB to the lower layer may be performed. Further, the DRB may be the SRB, and further, the DRB may be interpreted as the radio bearer without making a distinction between the SRB and the DRB. Further, the reconfiguration of the SDAP may be interpreted as reestablishment of the SDAP. Further, in a case that all of the DRBs associated with the SDAP entity are released, the SDAP entity may be released or reestablished. Further, in the reconfiguration of the SDAP entity, the SDAP entity may update the DRB associated with the SDAP entity. In the reconfiguration of the SDAP entity, the SDAP entity may delete all of the mapping rules (UL QoS flow to DRB mapping rules and/or DL QoS flow to DRB mapping rules) associated with the released DRB.

Further, the information for indicating the SDAP configuration of FIG. 18 may include information that can be used for determination of the list of the DRB identity of the DRB to be released or the list of the DRB identities to be released. In this case, in Step S2002, only the reconfiguration of the SDAP entity may be performed without indicating to the lower layer the information relating to the released DRB.

Further, the information denoted by mappedQoS-FlowsToRelease in the information for indicating the SDAP configuration of FIG. 18 may include information of all of the QFIs corresponding to the DRB identities included in the list of the DRB identity of the DRB to be released. In this case, in Step S2002, only the reconfiguration of the SDAP entity may be performed without indicating to the lower layer the information relating to the released DRB. Further, in this case, information of the released QFIs may be indicated from the SDAP layer to the RRC layer.

With reference to FIGS. 16 to 19 and FIGS. 21 and 22, another example of the DRB configuration procedure according to Embodiment 4 of the present invention will be described.

The processing unit 2202 of the gNB 108 creates the RRC reconfiguration message including the DRB configuration including a list of a DRB identity of a DRB to be released, and transmits the RRC reconfiguration message from the transmitter 2200. The processing unit 1702 of the UE 122 determines whether or not the list of the DRB identity of the DRB to be released is included in the RRC reconfiguration message including the DRB configuration received from the receiver 1700, and in a case that the DRB identity list is included in the RRC reconfiguration message, the processing unit 1702 performs DRB release processing (Step S2100).

Next, in the DRB release processing described above, the processing unit 1702 of the UE 122 releases the PDCP entity corresponding to an appropriate DRB identity for each DRB identity being a part of the current configuration of the UE 122 out of the DRB identities included in the DRB identity list described above (Step S2102). Further, subsequently to the operation of Step S2102, in a case that information for indicating that it is the reconfiguration involving synchronization is included in the RRC reconfiguration message described above, that is, in a case that appropriate processing is triggered by the reconfiguration involving synchronization, indication of released radio bearer information to the lower layer and reconfiguration of the SDAP entity are performed after the reconfiguration involving synchronization has succeeded. Further, in a case that information for indicating that it is the reconfiguration involving synchronization is not included in the RRC reconfiguration message described above, that is, in a case that appropriate processing is not triggered by the reconfiguration involving synchronization, the SDAP entity corresponding to an appropriate DRB identity is immediately reconfigured, and the information relating to the released DRB is indicated to the lower layer (Step S2104). Note that the lower layer may be interpreted as the SDAP layer.

Note that, in Step S2102 and Step S2104, the reconfiguration of the SDAP entity may be performed only once for the release of the DRB corresponding to all of the DRB identities included in the list of the DRB identity of the DRB to be released. Further, to indicate to the lower layer the information relating to the released DRB may be the DRB identity of the released DRB. Further, the lower layer may be the SDAP layer. Further, either the reconfiguration of the SDAP entity or the indication of the information relating to the released DRB to the lower layer may be performed. Further, the DRB may be the SRB, and further, the DRB may be interpreted as the radio bearer without making a distinction between the SRB and the DRB. Further, the reconfiguration of the SDAP may be interpreted as reestablishment of the SDAP. Further, in a case that all of the DRBs associated with the SDAP entity are released, the SDAP entity may be released or reestablished.

Further, the information for indicating the SDAP configuration of FIG. 18 may include information that can be used for determination of the list of the DRB identity of the DRB to be released or the list of the DRB identities to be released. In this case, in Step S2102 and Step S2104, only the reconfiguration of the SDAP entity may be performed without indicating the lower layer of the information relating to the released DRB.

Further, the information denoted by mappedQoS-FlowsToRelease in the information for indicating the SDAP configuration of FIG. 18 may include information of all of the QFIs corresponding to the DRB identities included in the list of the DRB identity of the DRB to be released. In this case, in Step S2102 and Step S2104, only the reconfiguration of the SDAP entity may be performed without indicating to the lower layer the information relating to the released DRB. Further, in this case, information of the released QFIs may be indicated from the SDAP layer to the RRC layer.

Note that the reconfiguration of the SDAP according to present Embodiment 4 may be reconfigured in a case that information for indicating that the SDAP entity is to be reconfigured is included in the information for indicating the SDAP configuration of FIG. 18. Note that the reconfiguration may be reestablishment.

As described above, according to Embodiment 4 of the present invention, the terminal apparatus can efficiently perform communication by reducing complexity of protocol processing.

Note that the DRB configuration according to an embodiment of the present invention may be included not only in the RRC connection reconfiguration procedure but also in an RRC Establishment procedure or an RRC Re-Establishment procedure.

In the embodiment of the present invention, although "LTE PDCP" is described, in a case that the PDCP is definitely a PDCP configured in an RRC entity for LTE described in NPL 4, "PDCP" may be used without adding the term LTE thereto.

Further, in each of the embodiments of the present invention, a higher layer than the SDAP may be the Non Access Strarum (NAS). Further, a higher layer than the RRC may be the NAS.

Further, in each of the embodiments of the present invention, the information for indicating that a full configuration is applied may be replaced by information for indicating that the DRB is to be added after being released, or may be information for indicating that the EPS bearer is maintained. Further, in a case of information for indicating that DRB release and addition corresponding to the EPS bearer is performed with the EPS bearer being maintained, the information may be information given another term.

Further, in each of the embodiments of the present invention, the information for indicating that it is the PDCP version change may be replaced by information for indicating that the DRB is to be added after being released, or may be information for indicating that the EPS bearer is maintained. Further, in a case of information for indicating that DRB release and addition corresponding to the EPS bearer is performed with the EPS bearer being maintained, the information may be information given another term.

A program running on an apparatus according to an aspect of the present invention may serve as a program that controls a Central Processing Unit (CPU) and the like to cause a computer to operate in such a manner as to realize the functions of the above-described embodiments according to an aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. In addition, a configuration in which components, which are described in the embodiments described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

The invention claimed is:

1. A terminal apparatus for communicating with a base station apparatus, the terminal apparatus comprising:
   reception circuitry configured to receive, from the base station apparatus, a Radio Resource Control (RRC) reconfiguration message including a list of a Data Radio Bearer (DRB) identity corresponding to a DRB to be released; and
   processing circuitry configured to, in a case that a first DRB identity corresponding to the DRB configured for the terminal apparatus is included in the list, release a Packet Data Convergence Protocol (PDCP) entity associated with the first DRB identity and indicate to a Service Data Adaptation Protocol (SDAP) layer information of the DRB corresponding to the first DRB identity.

2. A base station apparatus for communicating with a terminal apparatus, the base station apparatus comprising:
   transmission circuitry configured to transmit, to the terminal apparatus, a Radio Resource Control (RRC) reconfiguration message including a list of a Data Radio Bearer (DRB) identity corresponding to a DRB to be released; and
   processing circuitry configured to, in a case that a first DRB identity corresponding to the DRB configured for the terminal apparatus is included in the list, cause the terminal apparatus to release a Packet Data Convergence Protocol (PDCP) entity associated with the first DRB identity and indicate to a Service Data Adaptation Protocol (SDAP) layer information of the DRB corresponding to the first DRB identity.

3. A method for a terminal apparatus for communicating with a base station apparatus, the method comprising:
   receiving, from the base station apparatus, a Radio Resource Control (RRC) reconfiguration message including a list of a Data Radio Bearer (DRB) identity corresponding to a DRB to be released; and in a case that a first DRB identity corresponding to the DRB configured for the terminal apparatus is included in the list, releasing a Packet Data Convergence Protocol (PDCP) entity associated with the first DRB identity and indicating to a Service Data Adaptation Protocol (SDAP) layer information of the DRB corresponding to the first DRB identity.

4. A method for a base station apparatus for communicating with a terminal apparatus, the method comprising:

transmitting, to the terminal apparatus, a Radio Resource Control (RRC) reconfiguration message including a list of a Data Radio Bearer (DRB) identity corresponding to a DRB to be released; and in a case that a first DRB identity corresponding to the DRB configured for the terminal apparatus is included in the list, causing the terminal apparatus to release a Packet Data Convergence Protocol (PDCP) entity associated with the first DRB identity and indicating to a Service Data Adaptation Protocol (SDAP) layer information of the DRB corresponding to the first DRB identity.

* * * * *